(12) United States Patent
Straten

(10) Patent No.: US 10,007,651 B2
(45) Date of Patent: Jun. 26, 2018

(54) DETECT ERRORS IN INTERMEDIATE ELECTRONIC DOCUMENTS

(71) Applicant: Jens Straten, San Jose, CA (US)

(72) Inventor: Jens Straten, San Jose, CA (US)

(*) Notice: Subject to any disclaimer, the term of this patent is extended or adjusted under 35 U.S.C. 154(b) by 696 days.

(21) Appl. No.: 13/659,905

(22) Filed: Oct. 24, 2012

(65) Prior Publication Data
US 2013/0219268 A1 Aug. 22, 2013

Related U.S. Application Data

(60) Provisional application No. 61/600,580, filed on Feb. 17, 2012.

(51) Int. Cl.
| | | |
|---|---|---|
| H04N 21/00 | (2011.01) | |
| G06F 17/24 | (2006.01) | |
| G06F 17/21 | (2006.01) | |
| G06F 17/30 | (2006.01) | |
| G06F 11/07 | (2006.01) | |

(52) U.S. Cl.
CPC ........ *G06F 17/243* (2013.01); *G06F 11/0781* (2013.01); *G06F 17/211* (2013.01); *G06F 17/24* (2013.01); *G06F 17/30011* (2013.01); *G06F 17/212* (2013.01); *G06F 17/30905* (2013.01)

(58) Field of Classification Search
CPC ....... G06F 17/24; G06F 17/211; G06F 17/212
USPC .......................................................... 715/256
See application file for complete search history.

(56) References Cited

U.S. PATENT DOCUMENTS

| | | | | |
|---|---|---|---|---|
| 5,673,390 A | * | 9/1997 | Mueller | G06F 11/0724 708/104 |
| 6,820,094 B1 | * | 11/2004 | Ferguson et al. | |
| 7,272,795 B2 | * | 9/2007 | Garding | G06F 17/30306 714/E11.188 |
| 7,333,943 B1 | * | 2/2008 | Charuk et al. | 705/26.1 |
| 7,516,404 B1 | * | 4/2009 | Colby | G06F 17/2294 715/200 |
| 7,631,193 B1 | * | 12/2009 | Hoffman | 713/186 |
| 8,510,682 B2 | * | 8/2013 | Kusterer | G06F 3/0481 715/853 |
| 2002/0013731 A1 | * | 1/2002 | Bright | G06Q 10/087 705/22 |
| 2002/0103834 A1 | * | 8/2002 | Thompson et al. | 707/526 |
| 2003/0145047 A1 | * | 7/2003 | Upton | G06F 9/541 709/203 |
| 2003/0195777 A1 | * | 10/2003 | Greenstein | G06Q 10/06375 705/7.37 |
| 2004/0049445 A1 | * | 3/2004 | Kishore | 705/37 |
| 2004/0083164 A1 | * | 4/2004 | Schwartz et al. | 705/38 |

(Continued)

*Primary Examiner* — Cesar Paula
*Assistant Examiner* — Luu-Phuong Nguyen
(74) *Attorney, Agent, or Firm* — Douglas L. Weller

(57) ABSTRACT

In an embodiment, a document error handling method is disclosed. The document error handling method may include or comprise accessing an electronic document that includes or comprises a plurality of data fields, identifying a plurality of errors associated with the electronic document, and accessing a data field from among the plurality of data fields, wherein the data field corresponds to a selected error from among the plurality of errors. The document error handling method may also include or comprise editing the data field in response to an error editing input to thereby enable an elimination of the selected error.

19 Claims, 10 Drawing Sheets

(56) References Cited

U.S. PATENT DOCUMENTS

| | | | |
|---|---|---|---|
| 2004/0189708 A1* | 9/2004 | Larcheveque | G06F 17/2247 715/780 |
| 2004/0226002 A1* | 11/2004 | Larcheveque | G06F 17/2247 717/126 |
| 2004/0268229 A1* | 12/2004 | Paoli | G06F 17/243 715/200 |
| 2005/0114833 A1* | 5/2005 | Bates | G06F 8/33 717/110 |
| 2005/0120294 A1* | 6/2005 | Stefanison | G06F 17/248 715/223 |
| 2005/0278580 A1* | 12/2005 | Breitling | G06Q 10/00 714/39 |
| 2007/0162891 A1* | 7/2007 | Burner et al. | 717/115 |
| 2008/0040388 A1* | 2/2008 | Petri et al. | 707/104.1 |
| 2008/0115064 A1* | 5/2008 | Roach | G06F 3/04817 715/730 |
| 2009/0055761 A1* | 2/2009 | Basson | G06F 17/24 715/764 |
| 2009/0132406 A1* | 5/2009 | Brooks et al. | 705/35 |
| 2011/0255107 A1* | 10/2011 | Blau | 358/1.11 |
| 2012/0102002 A1* | 4/2012 | Sathyanarayana et al. | 707/687 |

* cited by examiner

DETECT ERRORS IN INTERMEDIATE ELECTRONIC DOCUMENTS

CROSS REFERENCE TO RELATED APPLICATIONS

This application claims the benefit of U.S. Provisional Application No. 61/600,580, filed on Feb. 17, 2012, which is incorporated herein by reference in its entirety.

TECHNICAL FIELD

The present application relates to the field of document error handling.

BACKGROUND

Data generation and tracking has become an important part of the business world. For example, a business may engage in enterprise resource planning (ERP) in order to plan and track information of interest, such as, but not limited to, information pertaining to finance/accounting operations, human resources, manufacturing, supply chain management, project management, customer relationship management, sales and services. Indeed, such data planning and tracking may be an extremely important factor in achieving financial success, such as in those industries that utilize electronic databases to store relatively large quantities of business-related data.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In an embodiment, a document error handling method is disclosed. The document error handling method may include or comprise accessing an electronic document that includes or comprises a plurality of data fields, identifying a plurality of errors associated with the electronic document, and accessing a data field from among the plurality of data fields, wherein the data field corresponds to a selected error from among the plurality of errors. The document error handling method may also include or comprise editing the data field in response to an error editing input to thereby enable an elimination of the selected error.

Additionally, in one embodiment, a document error handling method is disclosed, wherein the document error handling method may include or comprise accessing an electronic document that includes or comprises a plurality of data fields, identifying a plurality of errors associated with the electronic document, and accessing a data field from among the plurality of data fields, wherein the data field corresponds to a selected error from among the plurality of errors. The document error handling method may also include or comprise identifying one or more other errors from among the plurality of errors that correspond to the selected error, identifying one or more other data fields from among the plurality of data fields that correspond to the one or more other errors, respectively, and editing the data field in response to an error editing input to thereby enable an elimination of the selected error. The document error handling method may further include or comprise editing the one or more other data fields based on the editing of the data field to thereby enable an elimination of the selected error and an elimination of the one or more other errors.

Moreover, in an embodiment, a document error handling method is disclosed, wherein the document error handling method may include or comprise accessing an electronic document that includes or comprises a plurality of data fields, identifying a plurality of errors associated with the electronic document, and generating an error list of the plurality of errors. The document error handling method may also include or comprise accessing an error selection input associated with the error list, wherein the error selection input identifies a selected error from among the plurality of errors, automatically identifying a data field from among the plurality of data fields in response to the error selection input and based on the data field corresponding to the selected error, and editing the data field in response to an error editing input to thereby enable an elimination of the selected error. The document error handling method may further include or comprise removing the selected error from the error list in response to the elimination of the selected error.

DESCRIPTION OF THE DRAWINGS

The accompanying drawings, which are incorporated in and form a part of this specification, illustrate embodiments of the present technology, and, together with the Detailed Description, serve to explain principles discussed below.

Figure 1:
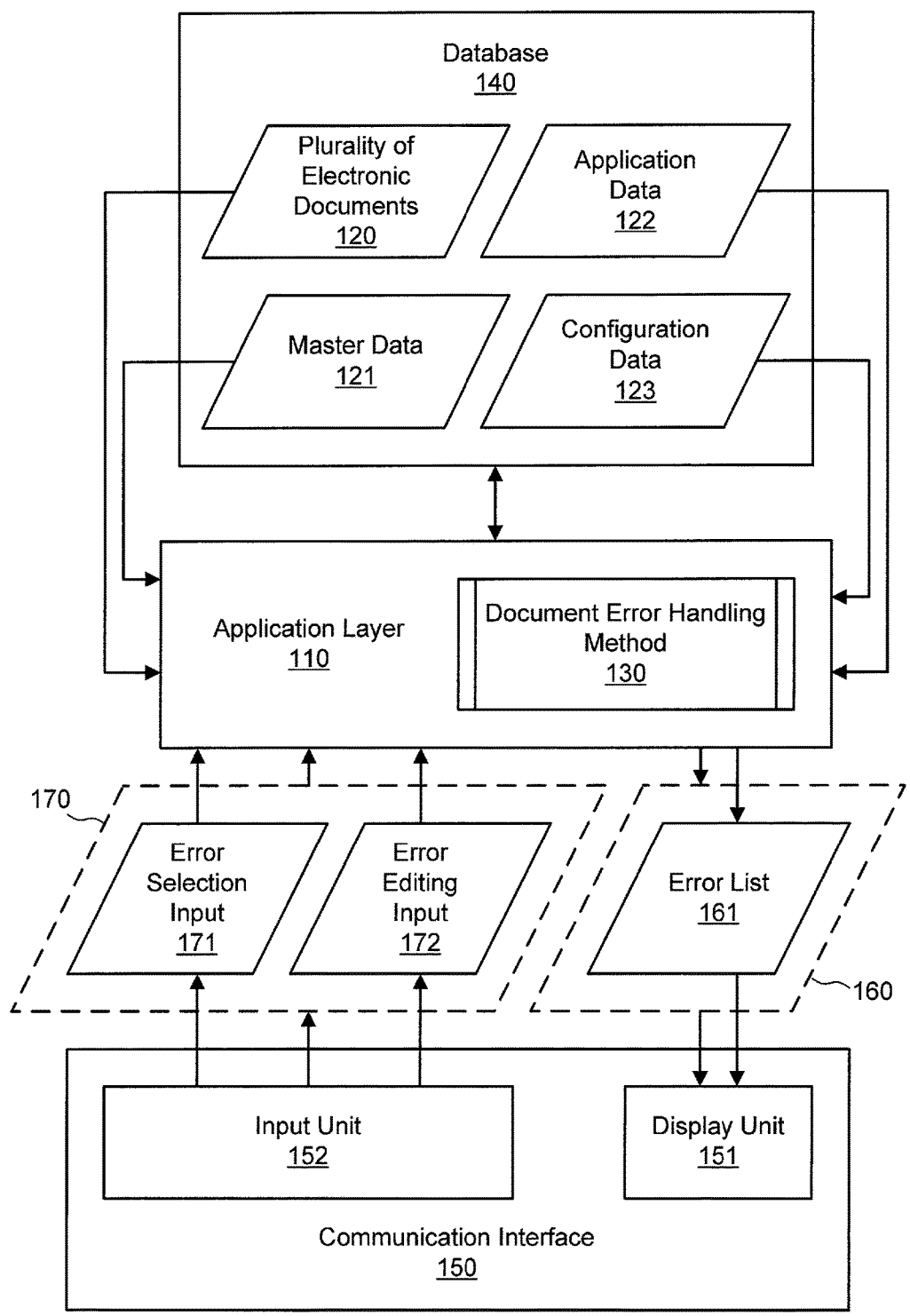
FIG. 1 is a block diagram of an exemplary document error handling system in accordance with an embodiment.

The drawings referred to in this description are not to be understood as being drawn to scale except if specifically noted, and such drawings are only exemplary in nature.

DETAILED DESCRIPTION

Reference will now be made in detail to embodiments of the present technology, examples of which are illustrated in the accompanying drawings. While the present technology will be described in conjunction with various embodiments, these embodiments are not intended to limit the present technology. Rather, the present technology is to be understood as encompassing various alternatives, modifications and equivalents.

Additionally, in the following Detailed Description, numerous specific details are set forth in order to provide a thorough understanding of the present technology. However, the present technology may be practiced without these specific details. In other instances, well-known methods, procedures, components, and circuits have not been described in detail so as to not unnecessarily obscure aspects of the exemplary embodiments presented herein.

Moreover, it is noted that discussions throughout the present detailed description that utilize terms indicating that some action or process is to occur may refer to the actions and processes of a computer system, or a similar electronic computing device. For example, the computer system or similar electronic computing device manipulates and transforms data represented as physical (e.g., electronic) quantities within the computer system's registers and memories into other data similarly represented as physical quantities within the computer system memories or registers, or other such information storage, transmission, or display devices. The present technology is also well-suited to the use of other computer systems, such as, for example, optical and mechanical computers.

The foregoing notwithstanding, it is further noted that terms indicating that some action or process is to occur may refer to manual actions or processes. Indeed, various embodiments of the present technology implement a combination of one or more computer-implemented actions or processes with one or more manual actions or processes. Moreover, one or more of these computer-implemented actions or processes may occur automatically, such as in response to a specific user input or the occurrence of a previous action or process.

Additionally, the terminology "coupled with" does not necessarily indicate a direct physical relationship. For example, when two components are described as being "coupled with" one another, there may be one or more other parts, materials, etc. (e.g., an adhesive or a signal/transmission line), that are coupled between, attaching, integrating, etc., the two components. As such, the terminology "coupled with" shall be given its broadest meaning, unless otherwise indicated.

Moreover, the terminology "communicatively associated with" does not necessarily indicate a physical relationship. For example, when two components are described as being "communicatively associated with" one another, these components may be configured to communicate with one another, for example, using a wireless and/or wired communication protocol. As such, the terminology "communicatively associated with" shall be given its broadest meaning, unless otherwise indicated.

Furthermore, the terminology "standard" is not to be interpreted as indicating that a particular feature is related to, or obvious in view of, the prior art. Nor is this terminology to be interpreted as necessarily indicating a default setting. Rather, the terminology "standard" is utilized herein to simply differentiate one feature from another (e.g., a standard editor versus an advanced editor), wherein such features may be distinguishable.

Overview

In accordance with an exemplary scenario, a number of electronic documents are generated, wherein these electronic documents are intermediate electronic documents (e.g., IDocs). In particular, information is arranged in each of these intermediate documents in a hierarchical format so as to enable the transfer of business-related information for various business transactions. These intermediate documents may be used to interface between two or more systems (e.g., between two ERP systems or between an ERP system and a translator module configured to provide data in an IDoc format).

In so much as a number of errors may be present in these IDocs, a rudimentary IDoc error handling process may be implemented. Indeed, in accordance with an exemplary implementation of an integrated ERP system, software program or module, a very basic electronic or Internet document (e.g., IDoc) error report with rudimentary editing capabilities is generated. However, the following results may be associated with this implementation: (1) the first error may be found in an IDoc, but subsequent errors in the IDoc are not identified; (2) many error messages may be difficult to understand; (3) an inability to pinpoint an error in the IDoc may exist; (4) there may be no guidance on error resolution; (5) an inability to add and/or remove groups of data (e.g., line items) may exist; (6) a lack of important business indicators may prevent or hinder the identification of important business data; (7) IDoc navigation may be cumbersome; and (8) design and functionality may be outdated.

An embodiment of the present technology provides highly useful IDoc error handling functionality to customers (e.g., system analysis customers and program development customers). For example, an integrated ERP system, software program or module, or a subsystem, software program or module integrated therewith (e.g., a software add-on), which may be referred to as a document error handling process or method, is implemented to provide IDoc error handling as a base functionality. This may be accomplished, for example, by loading IDocs in error from a database, such as a central database (e.g., a central database of the integrated ERP system, software program or module), into a program or application layer that provides a user with a graphical user interface (see, e.g., FIG. 1, as is further explored herein). It is noted that this application layer (such as the application layer shown in FIG. 1) may be an application layer of an integrated ERP software program or module with which a document error handling process or method of the present technology is integrated. It is further noted that, in an embodiment, unique functionality is added (e.g., to an integrated ERP software program or module) so as to simplify and accelerate the error handling process.

In view of the foregoing, it is noted that various embodiments of the present technology solve a number of the aforementioned problems. Indeed, various exemplary advantages of a number of embodiments of the present technology include, but are not limited to: (1) the ability to identify all errors in a single processing cycle; (2) allowing custom error messages; (3) guiding the user through all errors (e.g., with a standard editor); (4) business oriented IDoc navigation; (5) the capability to add and remove groups of data (e.g., line items), such as with an advanced editor; (6) supporting key business indicators so as to identify and prioritize business critical data; (7) providing integrated background processing that allows users to focus on error handling rather than posting (or re-posting) of IDocs; (8) supporting the summarization to mass change multiple duplicate errors across an entire IDoc in a single step; (9) error grouping (e.g. of master data errors); (10) customization through configuration (e.g., without development); and (11) full integration into a standard integrated ERP software program or module.

Various exemplary embodiments of the present technology will now be discussed. It is noted, however, that the present technology is not limited to these exemplary embodiments, and that the present technology also includes obvious variations of the exemplary embodiments and implementations described herein. It is further noted that various well-known components are generally not illustrated in the drawings so as to not unnecessarily obscure various principles discussed herein, but that such well-known components may be implemented by those skilled in the art to practice various embodiments of the present technology.

Moreover, although a number of examples provided herein reference the implementation of intermediate documents (e.g. IDocs), it is noted that the present technology is not limited to the implementation of any particular type of document. Indeed, a number of different types of documents may be utilized in accordance with the present technology.

Exemplary Systems and Configurations

With reference now to FIG. 1, an exemplary document error handling system 100 in accordance with an embodiment is shown. Exemplary document error handling system 100 includes an application layer 110, which may be, for example, a client-server based application layer of an integrated ERP software program or module. Application layer 110 is configured to receive and process one or more electronic documents from among a plurality of electronic documents 120 to thereby identify one or more errors associated with one or more of these electronic documents. In particular, application layer 110 is configured to initiate or execute a document error handling method 130 to thereby identify one or more of these errors, such as by identifying a number of errors associated with various data fields contained within the various documents.

In an embodiment, exemplary document error handling system 100 optionally includes or is integrated with a database 140, wherein database 140 may be configured to store application layer 110 such that application layer 110 may be accessed from database 140, such as by a communication interface 150. Database 140 may also be configured to store plurality of electronic documents 120 such that application layer 110 may be configured to receive or access plurality of electronic documents 120 from database 140. Indeed, in one embodiment, application layer 110 is launched locally (e.g., at communication interface 150) and database 140 is a central database (e.g., a central ERP database) located remotely. To illustrate, one example provides that application layer 110 is accessed from this central database over a communication network (e.g., over the Internet), and document error handling method 130 is executed by a local computer system that is communicatively associated or coupled with communication interface 150.

It is noted that plurality of electronic documents 120 may include, for example, a group of intermediate electronic documents (e.g., IDocs). It is further noted that each of these IDocs may be, for example, either customized (such as where a user has created his or her own IDoc type) or non-customized (such as where the IDoc has not been customized by the user). Indeed, an embodiment provides that the various IDocs may not be "called" or accessed in a "write" mode such that the IDocs may not be customized when they are initially accessed from database 140 by application layer 110. Pursuant to one embodiment, however, a number of custom data tables may be generated and accessed, and the various IDocs may be called or accessed in a "write" mode such that the IDocs may indeed be changed when they are initially accessed from database 140 by application layer 110. For example, the custom data tables may be utilized by application layer 110 in order to (1) configure an execution of document error handling method 130 or (2) implement a number of data locks during an execution of document error handling method 130, whereby the implemented data locks would prevent certain predefined user actions.

In accordance with an embodiment, application layer 110 includes, or accesses (such as, for example, from database 140), master data 121, application data 122 and configuration data 123, which may be utilized by application layer 110 to execute document error handling method 130. For example, master data 121 includes data that may be utilized to retrieve certain documents, such as those documents that list specific ordered materials or financial account management operations. Application data 122 includes data that utilizes master data 121 to create a particular document (e.g., business documents such as sales orders, inventory documents, invoices, etc.). Finally, configuration data 123 includes data (e.g., custom data tables) that enables a user to customize or configure an execution of document error handling method 130. Indeed, pursuant to one example, configuration data 123 may include a number of configuration tables that enable a user to manipulate entries within such tables to thereby alter a configuration of the document error handling process. In this manner, a user may customize how the document error handling process behaves and functions as well as how a corresponding graphical user interface appears when document error handling method 130 is being executed.

In an embodiment, exemplary document error handling system 100 optionally includes or is integrated with one or more communication interfaces, such as exemplary communication interface 150, wherein these one or more communication interfaces (which may be referred to, for example, as user nodes) may be communicatively associated or coupled with database 140 such that these one or more communication interfaces are able to access, or interact with, application layer 110. Each communication interface from among these one, or more communication interfaces may optionally include or be integrated with a display unit and an input unit, such as display unit 151 and input unit 152 shown in FIG. 1.

Each display unit (which may be referred to, for example, as a graphical user interface) is configured to display information to a user. For example, display unit 151 receives outputs 160 from application layer 110 that result from an execution of document error handling process. These outputs 160 may include, for example, an error list 161 generated by application layer 110 as a result of an execution of document error handling method 130, such as discussed further herein. Alternatively, or in addition to the foregoing, outputs 123 may include a number of other outputs, such as those discussed herein.

Each input unit (e.g., an alphanumeric keypad, touch screen or optical tracking device) is configured to generate electronic data in response to a user input. To illustrate, an embodiment provides that input unit 152 is configured to generate a number of inputs 170, such as an error selection input 171 and an error editing input 172, wherein error selection input 171 and error editing input 172 are utilized during an execution of document error handling method 130, such as discussed further herein. Alternatively, or in addition to the foregoing, inputs 170 may include a number of other inputs or selections, such as those discussed herein.

The foregoing notwithstanding, in an embodiment, a document error handling process of the present technology, such as document error handling method 130, is an add-on or module (e.g., an advanced business application programming software add-on) for an integrated enterprise resource planning software program or module platform (such as a customer relationship management software program or module platform) and/or any other system including electronic document (e.g., IDoc) processing capabilities. Moreover, in one embodiment, the communication between such a document error handling add-on or module and a backend system takes place through (1) function modules provided by integrated ERP software and (2) access to a shared database (e.g., database 140).

Figure 2:
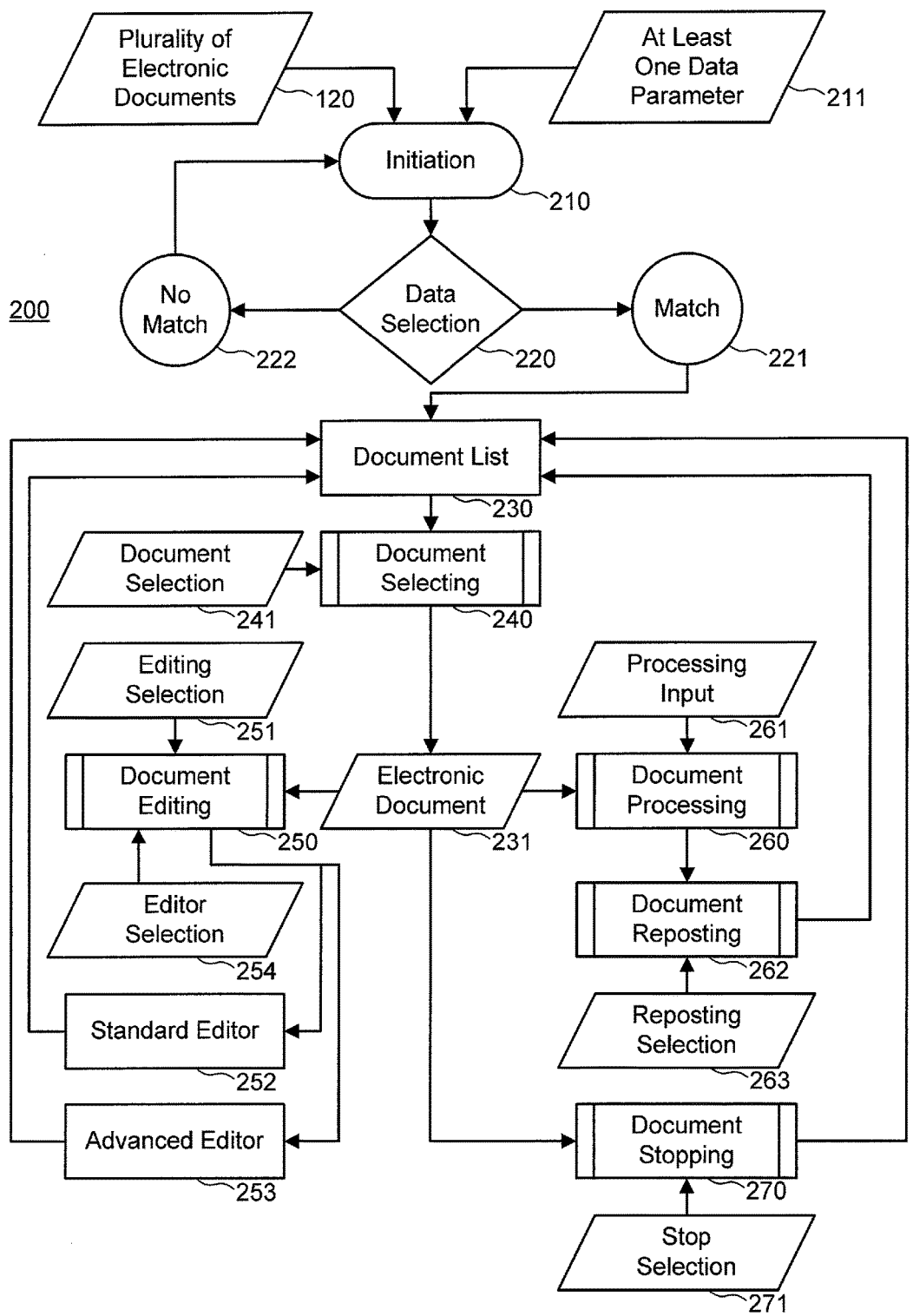
FIG. 2 is a flowchart of a first exemplary document error handling process in accordance with an embodiment.

With reference now to FIG. 2, a first exemplary document error handling process 200 in accordance with an embodiment is shown. First exemplary document error handling process 200 begins at initiation 210, whereby plurality of electronic documents 120 and at least one data parameter 211 are accessed. At data selection 220, a comparison is conducted between plurality of electronic documents 120 and at least one data parameter 211. If a match is identified between at least one data parameter 211 and a number of electronic documents from among plurality of electronic documents 120, wherein the match is identified in FIG. 2 as match 221, then a document list 230 of these matched electronic documents is generated. If no such match is generated, wherein a lack of such match is identified in FIG. 2 as no match 222, then the process starts over at initiation 210, and a message may optionally be displayed in a graphical user interface that (1) informs the user that no matches were found and/or (2) invites the user to run a new search.

To illustrate, consider the example where configuration data 123 includes a number of configuration tables each having one or more entries that may be customized by a user (e.g., "fully-customizable" data fields) and/or one or more entries that are not capable of being changed by the user. At least one data parameter 211 includes data from one or more of these customizable data entries such that configuration data 123 drives data selection 220. Moreover, in accordance with one embodiment, a custom filter is implemented, whereby a graphical user interface enables the user, such as with one or more "drop-down" menus or search fields, to select or input one or more applicable search parameters (e.g., type of material, sales order number, etc.) or data ranges.

In an embodiment, at document selecting 240, an electronic document 231 is selected from among the electronic documents listed in document list 230 in response to a document selection input 241. Next, one of three possible cases may be selected. Pursuant to a first case, electronic document 231 may be edited at document editing 250 in response to a document editing selection 251, such as when an edit icon or button (e.g., edit icon or button 310 discussed herein) is selected in a graphical user interface. Pursuant to a second case, electronic document 231 may be processed at document processing 260 in response to a document processing input 261, such as when a process icon or button (e.g., process icon or button 320 discussed herein) is selected in a graphical user interface, and based on a plurality of data fields associated with electronic document 231. Pursuant to a third case, electronic document 231 is stopped at document stopping 270 in response to a document stop selection 271, such as when a stop icon or button (e.g., stop icon or button 330 discussed herein) is selected in a graphical user interface.

In the first case, wherein electronic document 231 is to be edited in response to document editing selection 251, electronic document 231 is edited by either a standard editor 252 or an advanced editor 253 in response to an editor selection 254, such as further discussed herein. Consider the example where an IDoc fails the initial IDoc processing process, and where a number of errors with the IDoc are identified. These errors are displayed to the user in a graphical user interface, and the user then has the option of editing this failed IDoc so as to correct or eliminate one or more of these identified errors. In particular, the user will input editing selection 251 to launch the document editing process. Additionally, editor selection 254, which may be, for example, (1) input by the user in real-time or (2) preconfigured into the program at a previous point in time (e.g., pursuant to a system default), selects one of standard editor 252 and advanced editor 253. In one embodiment, a number of IDoc errors, as well as a corresponding screen to resolve these errors, may be displayed by the selected editor. After being edited by one of standard editor 252 and advanced editor 253, various changes to electronic document 231 may optionally be saved into memory.

In addition to the foregoing, an embodiment provides that electronic document 231 is removed from document list 230 when electronic document 231 has been successfully processed by document processing 260. Moreover, in accordance with one embodiment, if electronic document 231 contains no further errors, document list 230 indicates that electronic document 231 is ready for processing.

In an embodiment, standard editor 252 is driven by error messages such that when a user selects one of the displayed error messages from within a generated error list, a number of data fields are displayed that will help the user to resolve the selected error, and the resolved error is consequently removed from the displayed error list. Once each of the various errors has been resolved, the user may choose to save the edited IDoc. The foregoing notwithstanding, one embodiment provides that the user is provided the option, even when a number of errors within the IDoc have not yet been resolved, of saving the IDoc and updating document list 230 such that the user may subsequently select this IDoc from document list 230 so as to edit or process the IDoc at a future point in time. For example, a user might resolve a few errors, save the edited IDoc, and then resume working on the remaining errors at a later time.

In contrast to standard editor 252, an embodiment provides that advanced editor 253 is not error driven, but rather is a "free" editor. To illustrate, an exemplary implementation provides that advanced editor 253 enables a user to use, for example, business terms that the user is familiar with from the transaction layer of the error handling algorithm. Consequently, a number of data fields, such as header fields, partner fields, date fields and item label fields, may be implemented, wherein the user would be able to manually manipulate data within a number of these data fields so as to correct the identified errors that are associated with the selected IDoc.

In the second case, wherein electronic document 231 is to be processed at document processing 260 in response to document processing input 261 and based on the plurality of data fields associated with electronic document 231, electronic document is reprocessed (such as where standard ERP functionality associated with or embedded within application layer 110 is called to reprocess a selected IDoc) and then either reposted at document reposting 262 in response to a document reposting selection 263 or stopped at document stopping 270 in response to document stop selection 271. It is noted that, pursuant to one exemplary implementation, document stopping changes the status of an IDoc to "no further processing", which may be a status that results in document archiving, although the archiving process itself is executed by a process of the ERP system that is not handled by the implemented document error handling method 130.

For example, when an IDoc fails the initial IDoc processing process, such as when a number of data fields within the IDoc are found to include erroneous data when these data fields are compared to a data template for that particular IDoc, then a numerical fail status (e.g., a predefined numerical status of 51) is assigned to the IDoc. However, when a user changes one or more data fields within the IDoc, the status of this IDoc changes again to an edited status (e.g., a predefined numerical status of 69). Thus, during document processing 260, the edited IDoc is rechecked for compliance, and, consequently, this IDoc will either post within a list of compliant IDocs or else fail (in which case it is again assigned a fail status). It is noted that, in one embodiment, this processing occurs in the background of document error handling method 130 such that a user may continue working with another portion of the algorithm without interruption.

In the third case, wherein electronic document 231 is to be stopped in response to a document stop selection 271, electronic document is stopped such that electronic document is no longer reviewed or processed. Furthermore, in one embodiment, once the overall process has been stopped, the process automatically begins again at initiation 210. For example, the user may select a stop icon or button shown within the graphical user interface, which will change the status of the IDoc to "no further processing" (e.g., a predefined numerical status of 68).

Figure 3:
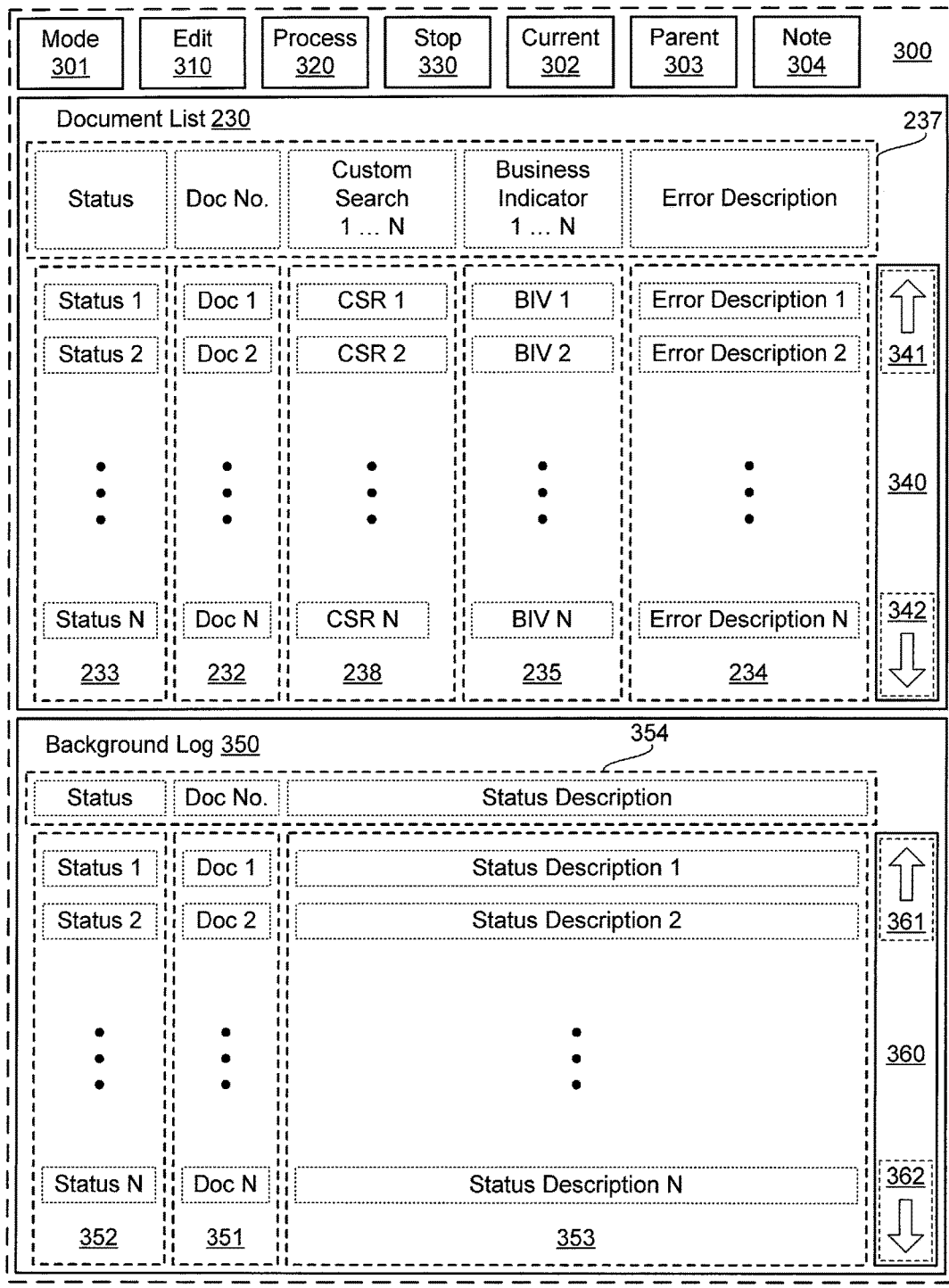
FIG. 3 is a diagram of an exemplary document listing configuration in accordance with an embodiment.

With reference now to FIG. 3, an exemplary document listing configuration 300 in accordance with an embodiment is shown. Exemplary document listing configuration 300 includes document list 230, wherein a number of electronic documents 232 from among plurality of electronic documents 120 are listed as a result of the aforementioned comparison that yields match 221. For example, in FIG. 3, electronic documents 1 through N are listed within document list 230, wherein N is an integer value, and wherein electronic documents 1 through N are represented in FIG. 3 with the labels "Doc 1" through "Doc N", respectively.

Moreover, pursuant to one exemplary implementation, document list 230 provides a user with a sorted display of electronic documents (e.g., IDocs) in error. It is noted that the sorting may be based, for example, on simple fields, such as a date of creation, custom search fields, such as the applicable purchase order number, or complex selected business indicators, such as a sales order value. Additionally, document list 230 may optionally include informative data (e.g., that an IDoc is locked by another user, that an IDoc is ready for processing, ownership of an IDoc, etc.) and custom business indicators (e.g., total order value) that will allow the user to identify and prioritize business-related IDocs. Moreover, document list 230 may also include the first error message for each IDoc in error. Furthermore, document list 230 may include various options that enable the user to manipulate the display of the IDoc list.

In an embodiment, document list 230 includes a number of status identifiers 233. In particular, each electronic document from among electronic documents 232 may be labeled with a status identifier selected from among a plurality of possible status identifiers, wherein the labeled status identifiers indicate status information pertaining to that electronic document. For example, in FIG. 3, status identifiers 1 through N are listed within document list 230, wherein N is an integer value, and wherein status identifiers 1 through N are represented in FIG. 3 with the labels "Status 1" through "Status N", respectively. Moreover, Statuses 1, 2 and N are positioned in the same data rows as Docs 1, 2 and N, respectively, such that Docs 1, 2 and N are labeled with Statuses 1, 2 and N, respectively. It is noted that such a status identifiers may indicate, for example, whether its corresponding electronic document is accessible (e.g., capable of being edited) or locked (e.g., incapable of being edited), or whether such electronic document is ready for processing.

With reference still to FIG. 3, in one embodiment, document list 230 may include a number of custom search fields, such as, for example, "Sold-To Customer", "Material", "Purchase Order Number", and others. To illustrate, an electronic document from among electronic documents 232 may be associated with one or more custom search results (e.g., a customer that submitted a purchase order that corresponds to that electronic document) from among a list of custom search results (CSRs) 238. For purposes of illustration, in FIG. 3, custom search results "CSR 1" through "CSR N" are listed within document list 230, wherein N is an integer value.

Moreover, as previously indicated, document list 230 may be configured to display a number of electronic documents (e.g., IDocs) in error. To illustrate, and with reference still to FIG. 3, an embodiment provides that a number of errors associated with electronic documents 232 are identified (such as where an invalid currency has been entered into a financial data field of a particular document), and error descriptions 234 corresponding to these errors are displayed within document list 230. For example, errors 1 through N are identified as corresponding to Docs 1 through N, respectively, and Error Descriptions 1 through N are listed within document list 230, wherein N is an integer value, and wherein Error Descriptions 1 through N include information describing errors 1 through N, respectively. Moreover, Error Descriptions 1, 2 and N are positioned in the same data rows as Docs 1, 2 and N, respectively, such that Error Descriptions 1, 2 and N are shown to correspond to Docs 1, 2 and N, respectively.

Furthermore, as previously indicated, document list 230 may optionally list a number of business indicators (e.g., total order value) that will enable the identification and prioritization of business-related documents. To illustrate, and with reference still to FIG. 3, an embodiment provides that a plurality of predefined business indicator values (BIVs) 235 associated with electronic documents 232, respectively, are identified and listed. For example, BIVs 1 through N are identified as corresponding to Docs 1 through N, respectively, and, in FIG. 3, BIVs 1 through N are listed within document list 230, wherein N is an integer value, and wherein BIVs 1 through N are represented in FIG. 3 with the labels "BIV 1" through "BIV N", respectively. Moreover, BIVs 1, 2 and N are positioned in the same data rows as Docs 1, 2 and N, respectively, such that Docs 1, 2 and N are shown to correspond to BIVs 1, 2 and N, respectively. Furthermore, in accordance with one exemplary implementation, electronic documents 232 are sorted in document list 230 based on plurality of BIVs 235. In this manner, documents with the same or similar BIVs are grouped together within document list 230.

With reference still to FIG. 3, in an embodiment, document list 230 includes a number of information headings 237 corresponding to one or more of electronic documents 232, status identifiers 233, CSRs 238, error descriptions 234 and BIVs 235. For example, in FIG. 3, electronic documents 232 are labeled by the vertical information heading "Doc No.", status identifiers 233 are labeled by the vertical information heading "Status", customer search results 238 are labeled by the vertical information heading "Custom Search 1 . . . N", wherein N is an integer value (such that it shall be understood that a number of different custom searches may be implemented), and error descriptions 234 are labeled by the vertical information heading "Error Description". In one embodiment, however, error descriptions 234 are labeled by the vertical information heading "First Error", such as to indicate that the listed error was the first error identified in the corresponding electronic document.

Finally, BIVs 235 are labeled by the information heading "Business Indicator 1 ... N", wherein N is an integer value (such that it shall be understood that a number of different business indicators may be implemented). For example, a number of different business indicators (e.g., total order quantity and total order value) may be implemented, and different business indicator columns may be presented so as to organize each business indicator value into its appropriate business indicator column, wherein each BIV is labeled with its corresponding business indicator heading (e.g. "Total Order Quantity" or "Total Order Value").

Pursuant to one exemplary implementation, an entirety of document list 230 is not viewable within a window within a graphical user interface. As such, and with reference still to FIG. 3, an embodiment provides that document list 230 includes or is integrated with a scrollbar 340, which may include, for example, a scroll up icon or button 341 and a scroll down icon or button 342, wherein a selection of scroll up icon or button 341 enables a scrolling up through document list 230, and wherein a selection of scroll down icon or button 342 enables a scrolling down through document list 230.

With reference still to FIG. 3, exemplary document listing configuration 300 also includes edit, process and stop icons or buttons 310, 320, 330, wherein a selection of edit, process and stop icons or buttons 310, 320, 330 causes a selected electronic document (e.g., an electronic document listed within document list 230, such as one of Docs 1 through N) to be edited, processed or stopped, respectively, such as in a manner described herein. Additionally, exemplary document listing configuration 300 may optionally include one or more of a mode icon or button 301, a current icon or button 302, a parent icon or button 303 and a note icon or button 304. A selection of mode icon or button 301 enables a user to switch between a "display" mode and an "edit" mode, wherein the editable documents listed within document list 230 may not be selected and edited when document list 230 is in the "display" mode, but wherein these same editable documents may be selected and edited when document list 230 is in the "edit" mode. A selection of current icon or button 302 causes a current version of a selected electronic document (rather than its parent document) to be displayed to the user in a graphical user interface. In contrast, a selection of parent icon or button 303 causes the parent electronic document of a selected document to be displayed to the user in the graphical user interface. Finally, a selection of note icon or button 304 opens a window (e.g., a pop-up window) within the graphical user interface, wherein the user is provided the option of attaching or linking a note to a selected document.

With reference still to FIG. 3, exemplary document listing configuration 300 may also optionally include a background log 350 (which may be referred to, for example, as an activity log), wherein background log 350 may be updated, for example, when a selected electronic document (e.g., electronic document 231) is edited, processed or stopped. For example, in an embodiment, a user selects process icon or button 320, and the processing of the selected electronic document consequently commences, wherein this processing occurs in the background of the document error handling process such that a user may continue working with another portion of the algorithm without interruption. However, background log 350 will continue to display the results of this processing to the user.

In particular, in FIG. 3, background log 350 lists a number of selected electronic documents 351 and their corresponding status identifiers 352, such as in a manner described above with reference to document list 230. Additionally, a number of status descriptions 353 associated with selected electronic documents 351 and status identifiers 352 are identified and listed within background log 350. For example, status descriptions 1 through N are identified as corresponding to Docs 1 through N, respectively, and, in FIG. 3, Status Descriptions 1 through N are listed within document list 230, wherein N is an integer value, and wherein Status Descriptions 1 through N include information describing the respective statuses of Docs 1 through N, respectively. Moreover, Status Descriptions 1, 2 and N are positioned in the same data rows as Docs 1, 2 and N, respectively, such that Status Descriptions 1, 2 and N are shown to correspond to Docs 1, 2 and N, respectively. Furthermore, pursuant to one exemplary implementation, each of status identifiers 352 includes an icon that indicates a status of the selected document. For example, a status identifier may include a green icon indicating that the processed document has passed or a red icon indicating that the processed document has failed.

With reference still to FIG. 3, in an embodiment, background log 350 includes a number of information headings 354 corresponding to one or more of selected electronic documents 351, status identifiers 352 and status descriptions 353. For example, in FIG. 3, selected electronic documents 351 are labeled by the vertical information heading "Doc No.", status identifiers 352 are labeled by the vertical information heading "Status", and status descriptions 353 are labeled by the vertical information heading "Status Description".

Pursuant to one exemplary implementation, an entirety of background log 350 is not viewable within a window within a graphical user interface. As such, and with reference still to FIG. 3, an embodiment provides that background log 350 includes or is integrated with a scrollbar 360, which may include, for example, a scroll up icon or button 361 and a scroll down icon or button 362, wherein a selection of scroll up icon or button 361 enables a scrolling up through background log 350, and wherein a selection of scroll down icon or button 362 enables a scrolling down through background log 350.

Figure 4:
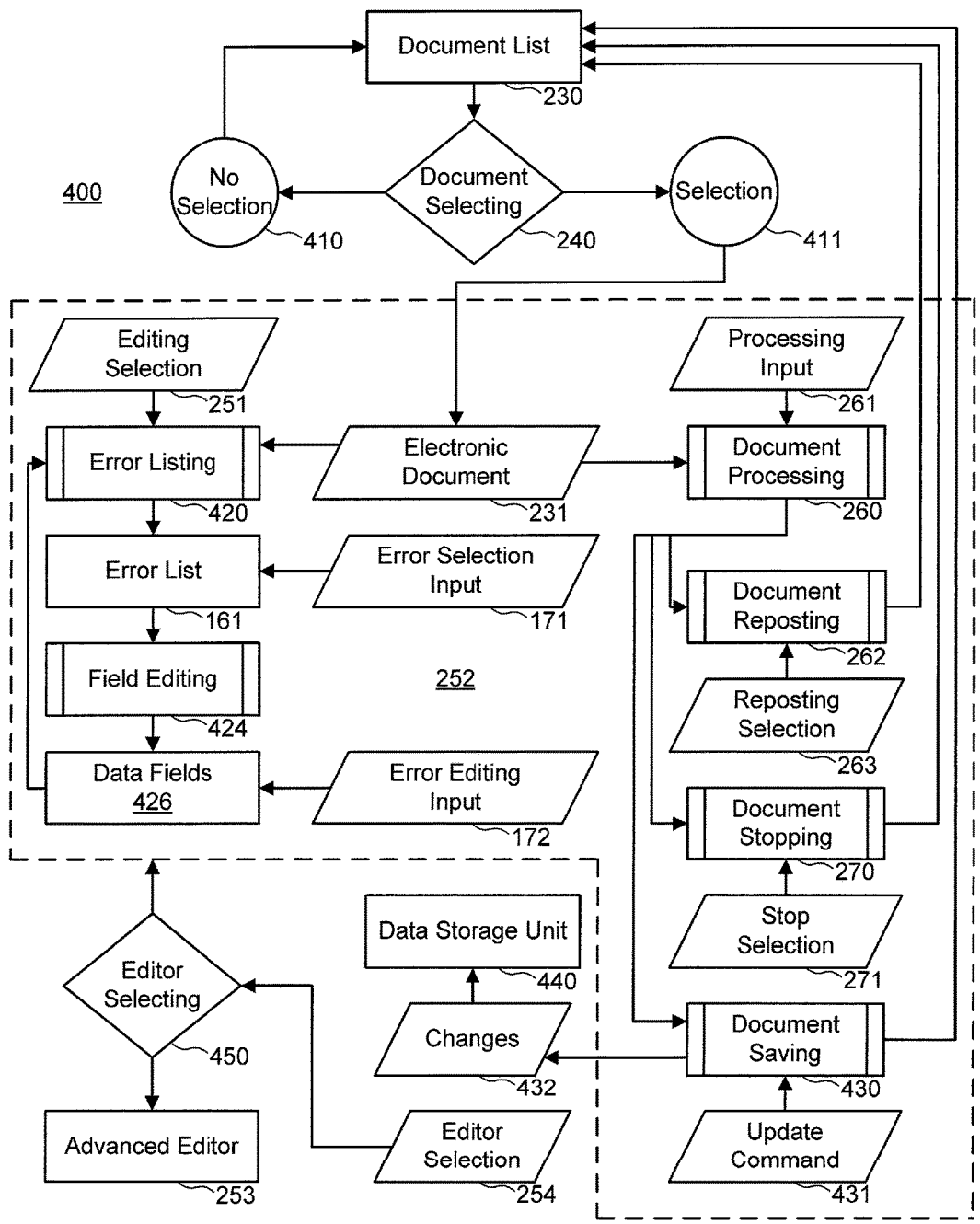
FIG. 4 is a flowchart of a second exemplary document error handling process in accordance with an embodiment.

With reference now to FIG. 4, a second exemplary document error handling process 400 in accordance with an embodiment is shown. Second exemplary document error handling process 400 begins with document list 230, which lists a number of electronic documents that each include a plurality of data fields. At document selecting 240, an option is provided (e.g., to a user) to select (e.g., manually select) one of the electronic documents listed within document list 230. If no such document is selected, wherein a lack of such a selection is identified in FIG. 4 as no selection 410, then the process remains stalemated at document list 230. However, if such a document (e.g., electronic document 231) is selected, wherein the selection is identified in FIG. 4 as selection 411, then the selected electronic document (e.g., electronic document 231) is accessed by a selected document editor. It is noted that, in FIG. 4, standard editor 252 has been selected such that electronic document 231 is accessed by standard editor 252.

Once electronic document 231 is accessed by standard editor 252, one of two possible cases may be selected. Pursuant to a first case, a plurality of errors associated with electronic document 231 are identified and listed at error listing 420 in response to editing selection 251. Pursuant to a second case, electronic document 231 may be processed at document processing 260 in response to document processing input 261 and based on the plurality of data fields associated with electronic document 231.

In the first case, the plurality of errors associated with electronic document 231 are identified and listed at error listing 420 in response to editing selection 251. In particular, error list 161 is generated, wherein error list 161 lists the plurality of identified errors. Next, an error selection input 171 associated with error list 161 is accessed, wherein error selection input 171 identifies a selected error from among the plurality of errors listed within error list 161. Subsequently, field editing 424 is implemented, whereby standard editor 252 dynamically identifies a number of data fields 426 within electronic document 231 that correspond to the selected error and displays these data fields 426 within the graphical user interface. Indeed, in an embodiment, standard editor 252 is configured to automatically identify data fields 426 from among the plurality of data fields included within electronic document 231 based on these particular data fields 426 corresponding to the selected error. Next, a data field from among data fields 426 is accessed, such as when a user selects one of the displayed data fields, and the accessed data field is edited in response to an error editing input 172 to thereby enable an elimination of the selected error. Finally, the selected error is removed from error list 161 in response to the elimination, such as where error listing 420 is reinitiated based on the results of error editing input 172.

In view of the foregoing, it is noted that a user may manually provide error editing input 172 so as to correct a selected error by editing a selected data field from among data fields 426. It is further noted that many possible solutions may exist with regard to editing a selected error. Consequently, this type of manual editing process may have certain advantages over an automated error correction process, as the user is provided with the ultimate decision as to which data field is to be edited as well as how such data field is to be edited.

The foregoing notwithstanding, in an embodiment, a data field from among data fields 426 is accessed, and the accessed data field is edited in response to error editing input 172 to thereby enable an elimination of the selected error as well as a number of other errors from among the plurality of errors that correspond to the selected error. To illustrate, consider the example where standard editor 252 is configured to automatically identify (1) one or more other errors from among the plurality of errors that correspond to the selected error and (2) one or more other data fields from among the plurality of data fields that correspond to the one or more other errors, respectively. Additionally, standard editor 252 is configured to automatically edit the one or more other data fields based on the editing of the accessed data field to thereby enable an elimination of the one or more other errors. Furthermore, standard editor 252 is configured to automatically remove the one or more other errors from error list 161 in response to the elimination of these one or more other errors.

In the second case, wherein electronic document 231 is to be processed at document processing 260 in response to document processing input 261 and based on the plurality of data fields associated with electronic document 231, electronic document 231 may be reposted at document reposting 262 in response to a document reposting selection 263 or stopped at document stopping 270 in response to a document stop selection 271, such as described above with reference to FIG. 2. However, a third option is also provided, whereby one or more changes to electronic document 231, such as exemplary changes 432, may be saved at document saving 430 in a data storage unit 440 (such as, for example, in database 140 or in a different data storage unit) in response to a document update command 431, wherein these changes reflect the editing of the aforementioned data field. This provides the user with the option of saving the IDoc and reprocessing it at a subsequent point in time. Moreover, an embodiment provides that document list 230 is updated or "refreshed" in response to the results of one or more of document reposting 262, document stopping 270 and document saving 430.

With reference still to FIG. 4, it is noted that standard editor 252 has been selected. In an embodiment, one of standard editor 252 and advanced editor 253 is selected at editor selecting 450 in response to an editor selection 254. For example, an exemplary implementation provides that a user may switch between standard editor 252 and advanced editor 253 by inputting editor selection 254. However, in one embodiment, one of standard editor 252 and advanced editor 253 is selected as a default editor, such as where editor selection 254 is a default setting of the error handling process.

Figure 5:
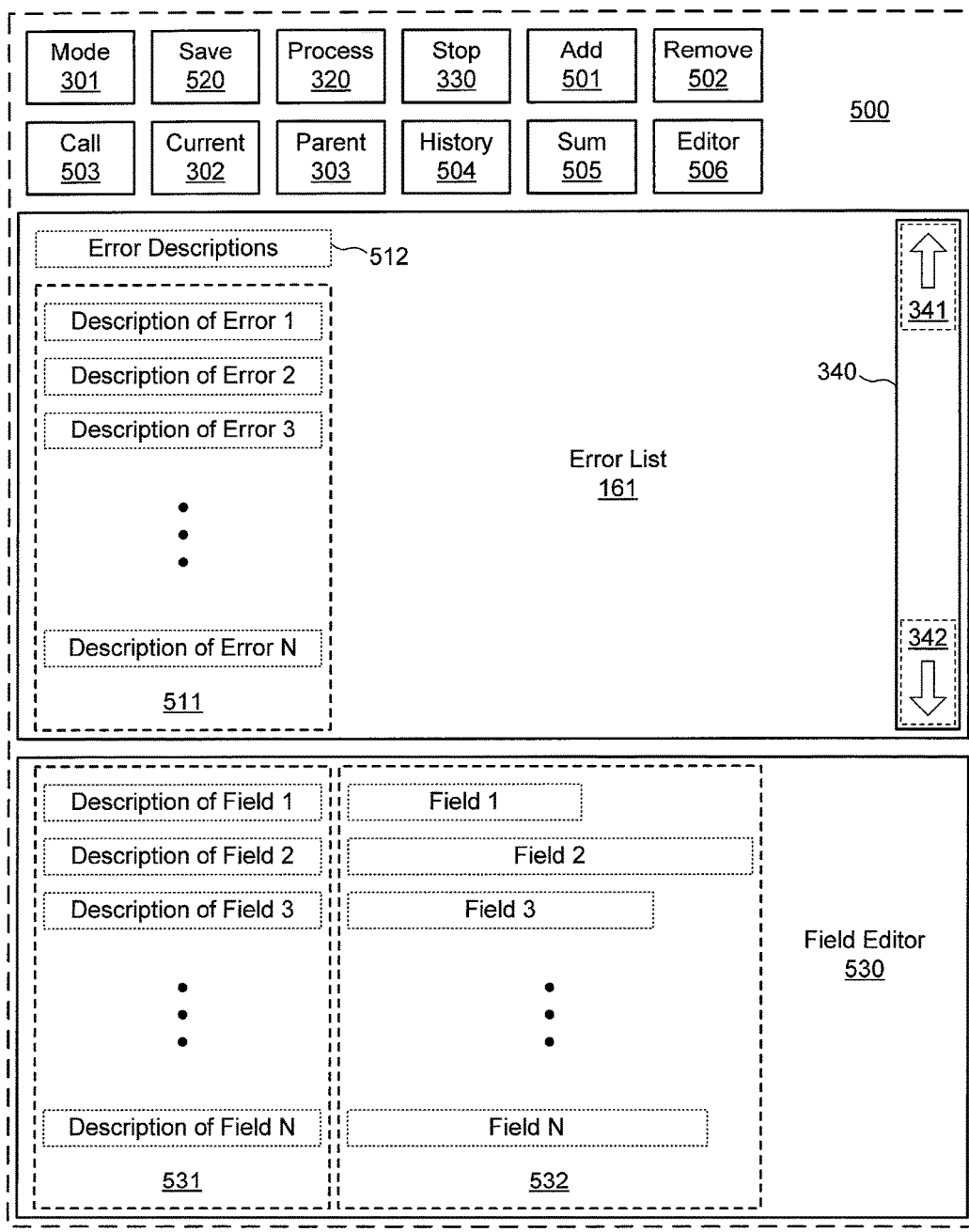
FIG. 5 is a diagram of a first exemplary document editing configuration in accordance with an embodiment.

With reference now to FIG. 5, a first exemplary document editing configuration 500 in accordance with an embodiment is shown. First exemplary document editing configuration 500 may be displayed within a graphical user interface when standard editor 252 is selected, wherein standard editor 252 may be the default editor for end users. It is noted that, pursuant to one exemplary implementation, the error handling process in standard editor 252 is driven by an error list displayed on top of the screen. This list allows the user to select an error (e.g., by double-clicking on such error within the error list), which results in the generation of a window below that displays data that is relevant to resolving the selected error. The user can then make changes or use this data to apply changes elsewhere (e.g., to master data) so as to resolve the error before proceeding to another error.

To further illustrate, it is noted that first exemplary document editing configuration 500 includes error list 161. In particular, a number of errors associated with electronic document 231 are identified, and error descriptions 511 corresponding to these errors are displayed within error list 161. For example, errors 1 through N are identified as corresponding to electronic document 231, and, in FIG. 5, Description of Error 1 through Description of Error N are listed within error list 161, wherein N is an integer value, and wherein Description of Error 1 through Description of Error N include information describing errors 1 through N, respectively. Additionally, error list 161 may optionally include an information heading 512 corresponding to error descriptions 511. For example, in FIG. 5, error descriptions 511 are labeled by the vertical information heading "Error Descriptions".

Pursuant to one exemplary implementation, an entirety of document list 230 is not viewable within a window within a graphical user interface. As such, and with reference still to FIG. 5, an embodiment provides that error list 161 includes or is integrated with scrollbar 340, which may include, for example, scroll up icon or button 341 and scroll down icon or button 342, wherein a selection of scroll up icon or button 341 enables a scrolling up through error list 161, and wherein a selection of scroll down icon or button 342 enables a scrolling down through error list 161.

With reference still to FIG. 5, first exemplary document editing configuration 500 may optionally include a field editor 530, wherein an error selected in error list 161 (such as pursuant to error selection input 171) updates a field selection in field editor 530. In particular, once an error is selected in error list 161, then a number of data fields 532 that correspond to the selected error are identified in field editor 530. Various data fields from among data fields 532, which are labeled in FIG. 5 as Fields 1 through N (wherein N is an integer value), may include different amounts of data. If a listed data field is editable, and the data field is edited such that the selected error is corrected, then the selected error will be removed from error list 161.

Thus, it is noted that, in accordance with an exemplary implementation, each data field from among data fields 532 may be either editable or non-editable. Consider the example where the account information listed in an IDoc for a particular invoice is incorrect. The user is able to correct the provided account-related information (e.g. the account number), but not the value of the goods or services provided. As such, this data field will be non-editable, whereas the data field corresponding to the erroneous account information will be editable. Moreover, one embodiment provides that different users (or different user groups) can be assigned different access rights to different data fields.

With reference still to FIG. 5, field editor 530 also lists a number of field descriptions 531 that correspond to data fields 532. For example, in FIG. 5, Fields 1 through N (wherein N is an integer value) are listed as corresponding to Description of Error 1 through Description of Error N, respectively. In this manner, field descriptions 531 communicate information that may be useful in the editing of data fields 532 in order to correct the selected error.

With reference still to FIG. 5, first exemplary document editing configuration 500 includes save, process and stop icons or buttons 520, 320, 330, wherein a selection of save, process and stop icons or buttons 520, 320, 330 causes a current electronic document (e.g., electronic document 231) to be edited, processed or stopped, respectively, such as in a manner described herein. However, in one embodiment, a selection of process icon or button 320 causes the current electronic document to be both saved and processed, whereas a selection of save icon or button 520 merely causes the current electronic document to be saved.

First exemplary document editing configuration 500 may also optionally include one or more of mode icon or button 301, current icon or button 302 and parent icon or button 303. A selection of mode icon or button 301 enables a user to switch between a "display" mode and an "edit" mode, wherein the editable documents listed within error list 161 may not be selected and edited when error list 161 is in the "display" mode, but wherein these same editable documents may be selected and edited when error list 161 is in the "edit" mode. A selection of current icon or button 302 causes a current version of a selected electronic document (rather than its parent document) to be displayed to the user in a graphical user interface. In contrast, a selection of parent icon or button 303 causes the parent electronic document of a selected document to be displayed to the user in the graphical user interface.

Moreover, in one embodiment, first exemplary document editing configuration 500 may optionally include one or more of add, remove, call, history, summarize and editor icons or buttons 501-506, as shown in FIG. 5. A selection of add icon or button 501 enables a user to add a group of data segments (e.g., a contract), whereas a selection of remove icon or button 502 enables the user to remove a group of data segments. A selection of call icon or button 503 enables a menu (e.g., a dropdown menu) to call a linked transaction, which may be configurable. A selection of history icon or button 504 provides change history for the current electronic document, such as in a change history list or menu. A selection of summarize icon or button 505 enables a user to switch the current error display mode between a summarized mode to a detailed mode. When in the summarized mode, error list 161 summarizes errors and allows the user to correct multiple errors in a single step. When in the detailed mode, each line of data within error list 161 represents a single error. Finally, a selection of editor icon or button 506 enables a user to switch from standard editor 252 to advanced editor 253.

It is noted that the exemplary editor screen shown in FIG. 5 contains one or more fields to help the user to resolve the currently selected error. For example, these fields may allow the user to resolve an error by directly changing the data in the current IDoc or by using this data to identify and change corresponding data in an ERP database (e.g., a purchase order or master data). Additionally, it is noted that the fields and their attributes may be specified in a predefined configuration, and that, pursuant to one exemplary configuration, it is possible to link data to a call transaction menu so as to submit displayed data to the called transaction.

In view of the foregoing, it is noted that, pursuant to one embodiment, standard editor 252 is error-guided, and that the user is provided the option of selecting which error he or she would like to resolve first (e.g., by double-clicking on such error within the error list). As a result, the editor in the bottom half of the screen, for example, is updated to include fields that allow the user to resolve the error. In an embodiment, those fields may be editable or may be displayed based on a selected configuration.

Figure 6:
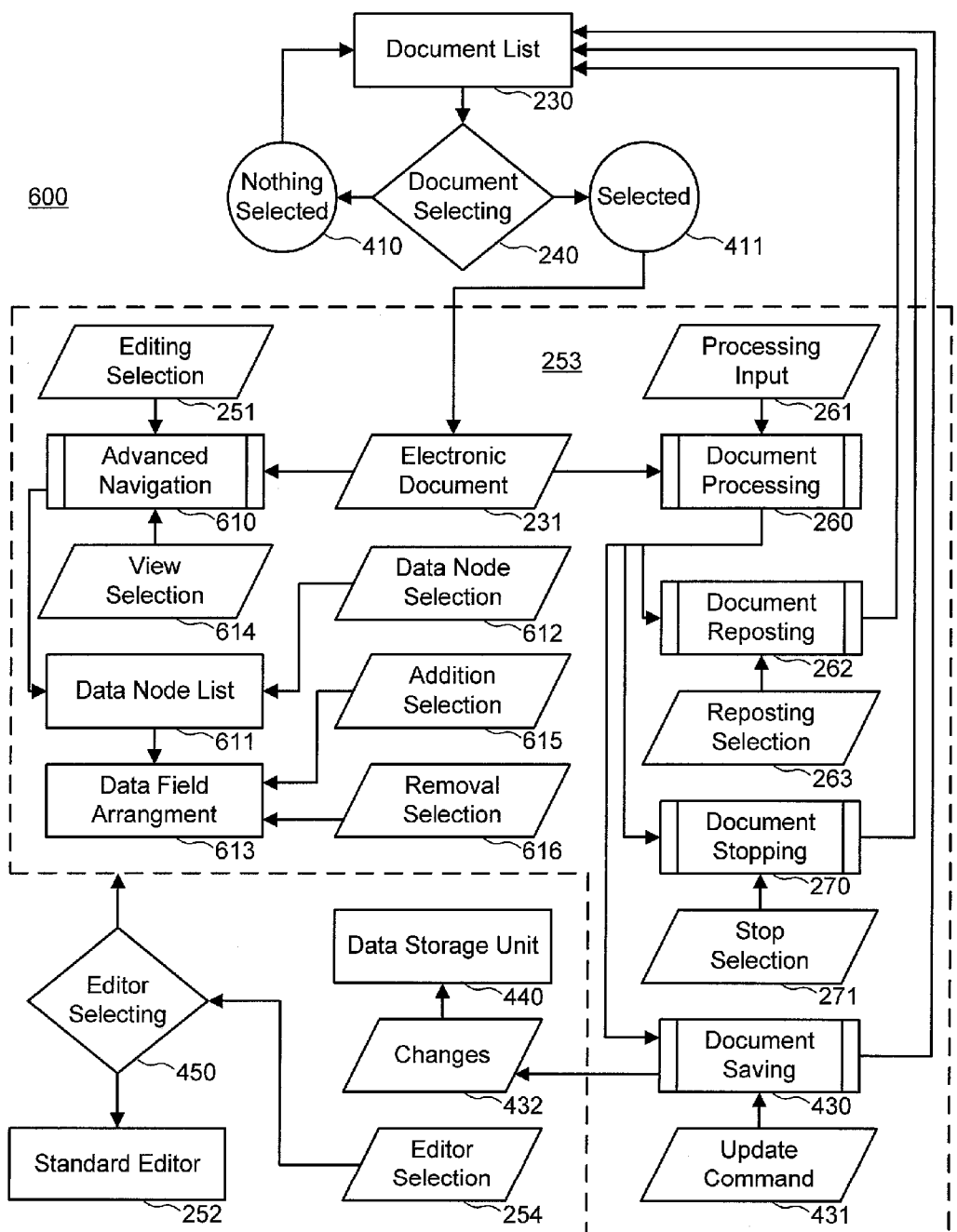
FIG. 6 is a flowchart of a third exemplary document error handling process in accordance with an embodiment.

With reference now to FIG. 6, a third exemplary document error handling process 600 in accordance with an embodiment is shown. In particular, once electronic document 231 is selected as a result of document selecting 240, such as described above with reference to FIG. 4, then electronic document 231 is accessed by a selected document editor. It is noted that, in FIG. 6, advanced editor 253 has been selected such that electronic document 231 is accessed by advanced editor 253.

Third exemplary document error handling process 600 includes save, process and stop icons or buttons 520, 320, 330, wherein a selection of save, process and stop icons or buttons 520, 320, 330 causes a current electronic document (e.g., electronic document 231) to be edited, processed or stopped, respectively, such as in a manner described herein. However, in one embodiment, a selection of process icon or button 320 causes the current electronic document to be both saved and processed, whereas a selection of save icon or button 520 merely causes the current electronic document to be saved.

With reference still to FIG. 6, once electronic document 231 is accessed by advanced editor 253, one of two possible cases may be selected. Pursuant to a first case, an advanced navigation paradigm 610 is implemented in response to editing selection 251. Pursuant to a second case, electronic document 231 may be processed at document processing 260 in response to document processing input 261 and based on the plurality of data fields associated with electronic document 231, such as described above with reference to FIG. 4.

In the first case, advanced navigation paradigm 610 is implemented, whereby a data node list 611 of a plurality of data nodes is generated, and whereby a data node selection 612 associated with data node list 611 is accessed, wherein data node selection 612 identifies a selected data node from among the plurality of listed data nodes. Moreover, in response to data node selection 612, a data field arrangement 613 is generated, wherein data field arrangement 613 includes a plurality of assigned data fields associated with the selected data node and a plurality of data field descriptions corresponding to the plurality of assigned data fields, respectively. It is noted that data field arrangement 613 may include either of a field editor or a list view editor based on a view selection 614, wherein these editors are described herein with reference to FIG. 7. The selected editor enables a data field to be edited to thereby enable an elimination of the selected error (and optionally a number of other errors from among a plurality of errors that correspond to the selected error).

With reference still to FIG. 6, it is noted that advanced editor 253 has been selected. In one embodiment, one of standard editor 252 and advanced editor 253 is selected at editor selecting 450 in response to editor selection 254. Indeed, one embodiment provides that a user may switch between standard editor 252 and advanced editor 253 by inputting editor selection 254.

It is further noted that, in an embodiment, advanced editor 253 allows full document (e.g., IDoc) editing, including advanced functionality such as adding (and/or removing) groups of data segments, such as rows or segments of horizontally aligned information that represent groups of data (e.g., line items) in a graphical user interface. For example, the user controls advanced editor 253 by selecting an item from an IDoc navigation menu (e.g. header data) which results in the right side of the screen displaying an IDoc field editor (which may be, for example, a field-based editor) or an IDoc advanced list view (ALV) editor (which may be, for example, a list-based editor), wherein the IDoc ALV editor may be configured to allow the adding and/or removing of groups of data (e.g., line items), and wherein, in both editors, fields may be editable or may be displayed based on a preselected configuration.

Figure 7:
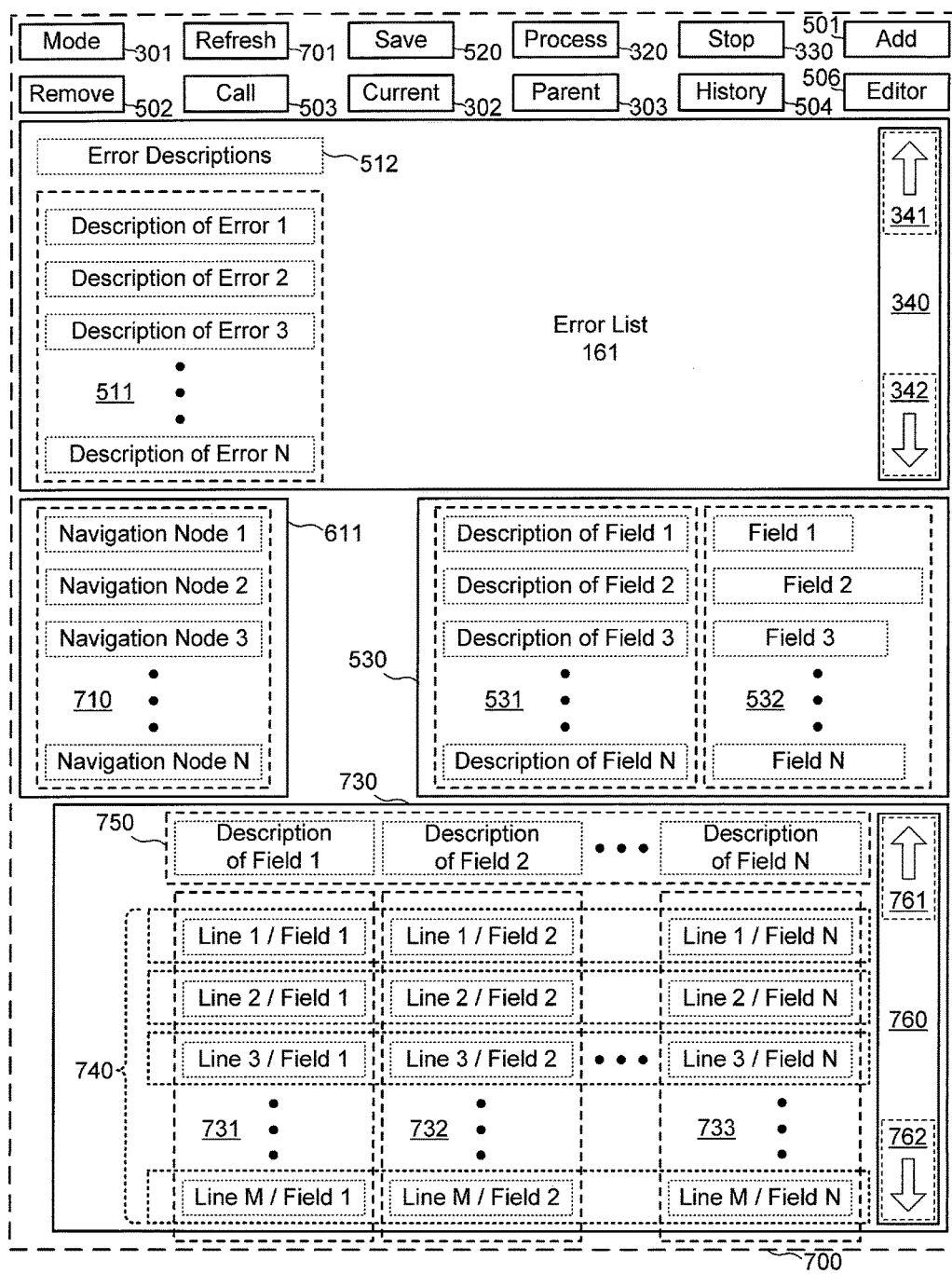
FIG. 7 is a diagram of a second exemplary document editing configuration in accordance with an embodiment.

To illustrate, and with reference now to FIG. 7, a second exemplary document editing configuration 700 in accordance with an embodiment is shown. Second exemplary document editing configuration 700 may be displayed within a graphical user interface when advanced editor 253 is selected, wherein advanced editor 253 is configured to enable the user to freely edit an electronic document (e.g., an IDoc). In particular, an exemplary implementation provides that, unlike standard editor 252, the error handling process in advanced editor 253 is driven by the user freely editing data in the IDoc. Moreover, in so much as an IDoc may contain a significant amount of data, document error handling method 130 may be configured to provide a configuration tree menu to allow data grouping, and it is also possible to display data in a list, such as by providing a list of item data.

To further illustrate, it is noted that second exemplary document editing configuration 700 may optionally include error list 161, such as described herein with reference to FIG. 5. Additionally, second exemplary document editing configuration 700 includes data node list 611, wherein a plurality of data nodes 710 are listed. For example, in FIG. 7, each data node from among data nodes 710 corresponds to a number of data fields 532, respectively, wherein these data fields 532 are associated with error descriptions 511 listed within error list 161. In particular, data node list 611 lists Navigation Node 1 through Navigation Node N, wherein data node list 611 may be referred to, for example, as a "tree navigation menu", and one embodiment provides that data node list 611 is a navigation menu that controls the display of field editor 530 or a list view editor 730 (which are described herein) based on the selected node.

However, although second exemplary document editing configuration 700 may optionally include error list 161, an embodiment provides that error list 161 does not drive the error handling process (such as in standard editor 252). In particular, unlike in standard editor 252, error list 161 in advanced editor 253 does not directly drive the user to a specific data field that may be edited to correct an identified data error. Rather, it is up to the user to translate or interpret the provided information. For example, data node list 611 lists various data areas within the current document (e.g., electronic document 231), and advanced editor 253 is controlled or driven by the user selecting a specific node within data node list 611. However, one exemplary implementation provides that data node list 611 is an IDoc navigation tree menu that sorts IDoc data (such as by business functionality) so as to enable relatively fast access to field information. Moreover, this IDoc navigation tree, in accordance with an embodiment, is customizable, such as where a user may select specific business functionality of interest pursuant to which the data will be sorted. Furthermore, one embodiment provides that, in advanced editor 253, error list 161 may be defaulted to a "detailed" error list display mode because this mode contains more information to aid the user in manually locating specific data within the current document.

In an embodiment, once a node in data node list 611 is selected, the screen on the right will change to reflect the selection by displaying fields that are assigned to the selected node. For example, in response to data node selection 612 within data node list 611, wherein data node selection 612 identifies a selected data node from among plurality of data nodes 710, one of a field editor 530 (such as described above with reference to FIG. 5) and list view editor 730 is generated, wherein the window in which list view editor 730 is displayed may be referred to, for example, as an advanced list view (ALV) such that list view editor 730 may itself be referred to, for example, as an ALV editor. A user may then utilize the generated editor to correct errors within the current document, such as error descriptions 511 that are optionally listed within error list 161. Moreover, although an embodiment provides that error list 161 does not directly drive the error handling process, it is noted that, pursuant to one exemplary implementation, an error message displayed within error list 161 may be linked to a node shown in the tree menu below so as to link the error to a specific screen or window that is launched in response to a selection of a data node within the tree menu.

List view editor 730 includes consecutive lines of data 731, 732 and 733 (e.g., Line 1 through Line M, wherein M is an integer value) for different data fields (e.g., Field 1 through Field N, wherein N is an integer value). Additionally, lines of data 731, 732 and 733 are arranged within list view editor 730 such that: the first line of each of the various data fields are organized into a first data segment of a plurality of data segments 740, the second line of each of the various data fields are organized into a second data segment of plurality of data segments 740, etc. Thus, for example, in FIG. 7, Line 1 of each of Fields 1 through M are organized into a first data segment, Line 2 of each of Fields 1 through M are organized into a second data segment, Line 3 of each of Fields 1 through M are organized into a third data segment, and Line M of each of Fields 1 through N are organized into a Mth data segment, wherein M is an integer value that is greater than 3. It is noted that the various data segments from among plurality of data segments 740 may be referred to, for example, as groups of data (e.g., line items). It is further noted that these groups of data (e.g., line items)

may be scaled or ordered in a hierarchical or split screen configuration so as to increase the user-friendliness of the data mining process.

In an embodiment, list view editor 730 optionally includes a number of information headings 750 corresponding to lines of data 731, 732 and 733 of the various data fields, respectively. For example, in FIG. 7, lines of data 731 of Field 1 are labeled by the vertical information heading "Description of Field 1", lines of data 732 of Field 2 are labeled by the vertical information heading "Description of Field 2", and lines of data 733 of Field 3 are labeled by the vertical information heading "Description of Field 3". It is noted that these labels are meant to help the user to manually locate data of interest.

In one embodiment, list view editor 730 is configured to enable the addition and/or removal of data segments, such as line items, from list view editor 730. For example, and with reference again to FIG. 6, an embodiment provides that plurality of data segments 740 are generated, and that an additional data segment is subsequently generated and added to plurality of data segments 740 in response to a data group addition selection 615. In a second example, plurality of data segments 740 are generated, and then one of the data segments from among plurality of data segments 740 are removed from plurality of data segments 740 in response to a data group removal selection 616. Thus, in addition to simply enabling the editing one or more data fields, it is also possible to display data in an advanced list view (ALV) such that data may be added to and/or removed from the ALV. Moreover, in one embodiment, the navigation tree, data fields and the ALV itself are freely configurable.

In view of the foregoing, an embodiment provides a user with the option of manually navigating through advanced editor 253 with data node list 611 (which may be positioned, for example, on a left side of the graphical user interface) and manually editing with either field editor 530 or list view editor 730 (which may be positioned, for example, on a right side of the graphical user interface). It is noted that data nodes 710 may optionally include or be linked to header fields, date fields, partner fields, item fields, etc. It is further noted that data nodes 710 may optionally be linked to corresponding errors within error list 161, although a selection of one of these data nodes would identify a group of corresponding data fields (rather than a particular data field as would be the case in standard editor 252). Alternatively, error list 161 may be completely disabled, and the user would simply edit manually without guidance from error list 161. Furthermore, in one embodiment, it is possible to control certain advanced functionality (e.g., the capability to add and remove data) by implementing a specific user-defined configuration.

With reference still to FIG. 7, second exemplary document editing configuration 700 includes save, process and stop icons or buttons 520, 320, 330, wherein a selection of save, process and stop icons or buttons 520, 320, 330 causes a current electronic document (e.g., electronic document 231) to be edited, processed or stopped, respectively, such as in a manner described herein. However, in one embodiment, a selection of process icon or button 320 causes the current electronic document to be both saved and processed, whereas a selection of save icon or button 520 merely causes the current electronic document to be saved.

Second exemplary document editing configuration 700 may also optionally include one or more of mode icon or button 301, current icon or button 302 and parent icon or button 303. A selection of mode icon or button 301 enables a user to switch between a "display" mode and an "edit" mode, wherein the editable documents listed within error list 161 may not be selected and edited when error list 161 is in the "display" mode, but wherein these same editable documents may be selected and edited when error list 161 is in the "edit" mode. A selection of current icon or button 302 causes a current version of a selected electronic document (rather than its parent document) to be displayed to the user in a graphical user interface. In contrast, a selection of parent icon or button 303 causes the parent electronic document of a selected document to be displayed to the user in the graphical user interface.

Moreover, in one embodiment, first exemplary document editing configuration 500 may optionally include one or more of add, remove, call, history and editor icons or buttons 501-504, 506 and a refresh icon or button 701, as shown in FIG. 7. A selection of add icon or button 501 enables a user to add a group of data segments, whereas a selection of remove icon or button 502 enables the user to remove a group of data segments. A selection of call icon or button 503 enables a menu (e.g., a dropdown menu) to call a linked transaction, which may be configurable. A selection of history icon or button 504 provides change history for the current electronic document, such as in a change history list or menu. A selection of editor icon or button 506 enables a user to switch from advanced editor 253 to standard editor 252. Finally, a selection of refresh icon or button 701 refreshes error list 161 (when error list 161 is optionally displayed).

It is noted that, in contrast to FIG. 5, a summarize icon or button is not displayed within FIG. 7. This is due to the fact that, in accordance with one exemplary implementation, error list 161, when optionally displayed in conjunction with advanced editor 253, is to be displayed in a detailed mode rather than in a summarized mode. Indeed, when in the detailed mode, each line of data within error list 161 represents a single error such that more information is displayed to aid the user in manually locating specific data within the current document than would otherwise be displayed in the summarized mode.

Finally, one embodiment provides that an entirety of list view editor 730 is not viewable within a window within a graphical user interface. As such, and with reference still to FIG. 7, an embodiment provides that list view editor 730 includes or is integrated with a scrollbar 760, which may include, for example, a scroll up icon or button 761 and a scroll down icon or button 762, wherein a selection of scroll up icon or button 761 enables a scrolling up through list view editor 730, and wherein a selection of scroll down icon or button 762 enables a scrolling down through list view editor 730.

Figure 8:
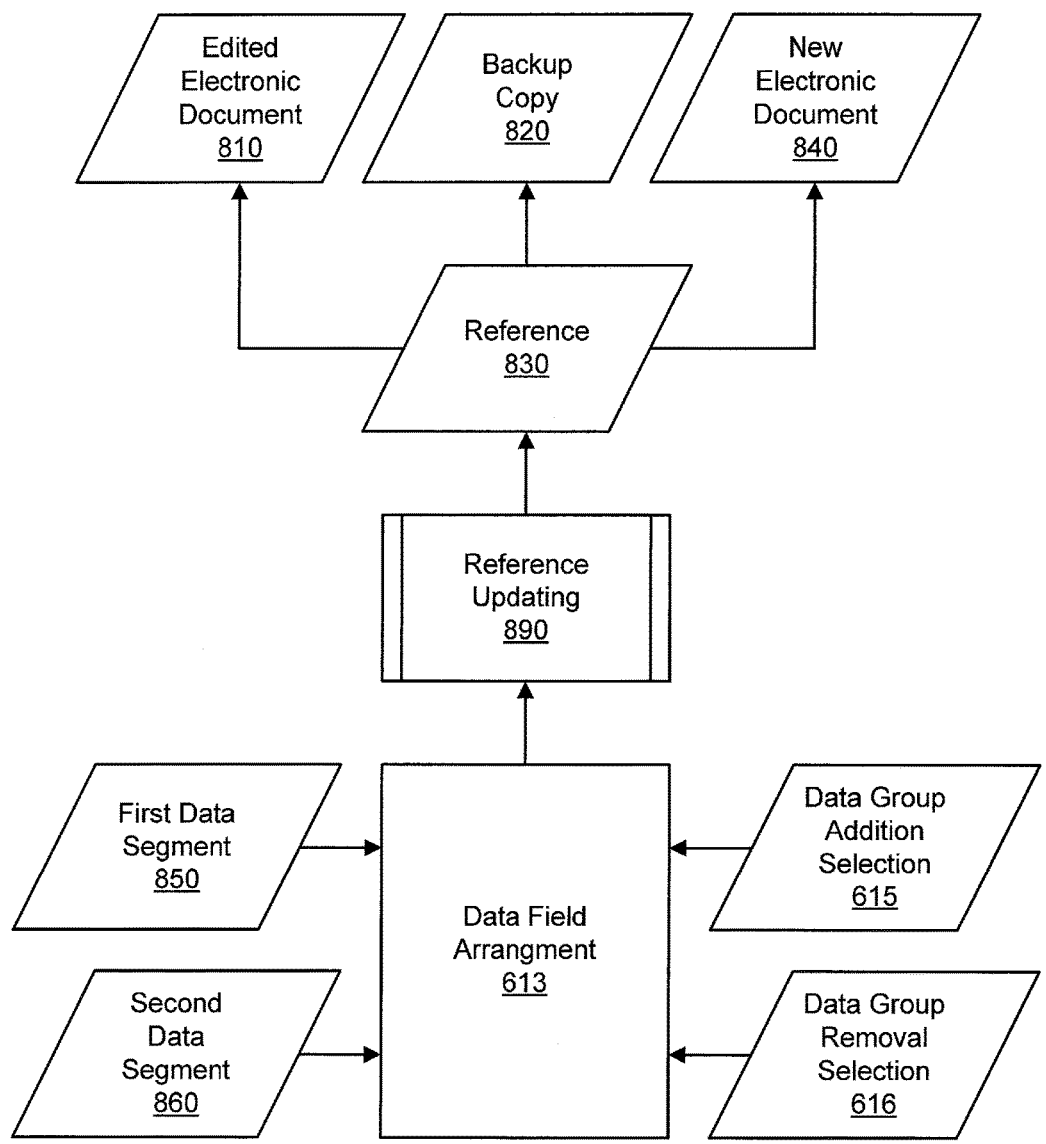
FIG. 8 is a diagram of an exemplary data segment editing configuration in accordance with an embodiment.

The foregoing notwithstanding, it is noted that a current ERP platform may teach away from the addition or removal of data groups (e.g., line items) rather than enabling such functionality. To illustrate, and with reference now to FIG. 8, an exemplary data segment editing configuration 800 in accordance with an embodiment is shown. In particular, an electronic document, such as electronic document 231, is initially edited, such as with a current ERP platform, wherein this edited electronic document is shown in FIG. 8 as edited electronic document 810. Additionally, a backup copy 820 of edited electronic document 810 is created based on the initial editing of edited electronic document 810. Moreover, a reference 830 is assigned to backup copy 820, wherein reference 830 links backup copy 820 to edited electronic document 810. As such, an exemplary implementation of a current ERP platform does not enable a data group addition or removal within edited electronic document 810 because the linking reference precludes such a modification.

However, an embodiment of the present technology overcomes this limitation. To illustrate, and with reference still to FIG. 8, a new electronic document 840 is created that corresponds to edited electronic document 810. For example, new electronic document 840 may be an exact copy of edited electronic document 810, except that new electronic document 840 is not linked to backup copy 820 when it is created. Consequently, a number of data group additions and/or removals may be carried out within new electronic document 840 irrespective of the link between edited electronic document 810 and backup copy 830. After such advanced editing has finished, the link between edited electronic document 810 is severed, and a new link between new electronic document 840 and backup copy 830 is established, such that new electronic document 840, along with the implemented data group additions and/or removals embodied therein, takes the place of edited electronic document 810.

To further illustrate, an exemplary implementation provides that new electronic document 840 includes the aforementioned plurality of assigned data fields that are associated with the aforementioned selected data node, wherein such data node is selected as a result of data node selection 612 (see, e.g., FIG. 6). Additionally, and with reference still to FIG. 8, a first data segment 850 is generated within data field arrangement 613, wherein first data segment 850 includes a first group of data from each data field from among the plurality of assigned data fields. Next, one or more data group additions and/or removals may be implemented within data field arrangement 613. For example, one or more additional segments, such as second data segment 860, are added within data field arrangement 613 in response to a data group addition selection 615, wherein second data segment 860 includes a second group of data from each data field from among the plurality of assigned data fields. Moreover, in a second example, one of first and second data segments 850, 860 is removed from data field arrangement 613 in response to a data group removal selection 616. Finally, a reference updating process 890 is implemented to update reference 830 such that backup copy 820 is linked to new electronic document 840 rather than to edited electronic document 810. In this manner, rather than saving the various data group additions and/or removals within edited electronic document 810, new electronic document 840 may be saved such that the data group additions and/or removals embodied therein are also saved, and edited electronic document 810 may then be deleted.

Figure 9:
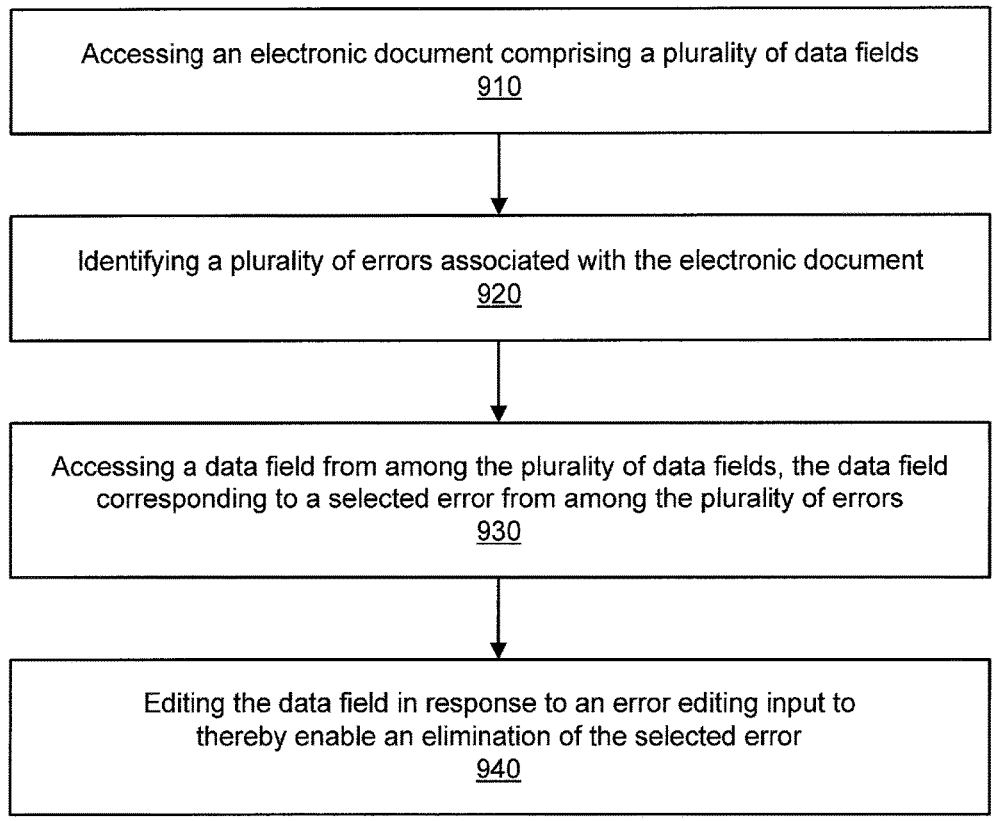
FIG. 9 is a flowchart of an exemplary method of document error handling in accordance with an embodiment.

With reference now to FIG. 9, an exemplary method of document error handling 900 in accordance with an embodiment is shown. Exemplary method of document error handling 900 includes accessing an electronic document including a plurality of data fields 910, identifying a plurality of errors associated with the electronic document 920, accessing a data field from among the plurality of data fields, wherein the data field corresponds to a selected error from among the plurality of errors 930, and editing the data field in response to an error editing input to thereby enable an elimination of the selected error. For example, in contrast to an ERP platform wherein merely a first error in an IDoc is identified during a single processing cycle, an embodiment provides that multiple errors in an IDoc are identified during a single processing cycle, and that a user is then provided with the option of correcting each of these errors, such as in a manner described herein.

In an embodiment, exemplary method of document error handling 900 also includes accessing a plurality of electronic documents and at least one data parameter, conducting a comparison between the plurality of electronic documents and the at least one data parameter, generating a document list of at least two electronic documents from among the plurality of electronic documents based on the comparison, and selecting the electronic document from among the at least two electronic documents in response to a document selection input. For example, a comparison is conducted between the plurality of electronic documents and a number of data parameters selected by a user, and, if a match is identified between the selected data parameters and a number of electronic documents from among the plurality of electronic documents, then a document list of these matched electronic documents is generated. Additionally, a number of errors are identified as being associated with these listed documents, respectively, such as a first error found in each document of any type, or such as a first error found in each document of a particular preselected error type or category. Error descriptions of these identified errors are displayed in a graphical user interface, and the user then inputs a selection of one of the listed documents, such as based on the displayed error information for the selected document, and this document is consequently accessed.

In one embodiment, exemplary method of document error handling 900 includes identifying a plurality of business indicator values associated with the at least two electronic documents, respectively. Exemplary method of document error handling 900 also includes ordering the at least two electronic documents in the document list based on the plurality of business indicator values. For example, a number of business indicator values (e.g., total order quantity and total order value) are identified, wherein these values may enable the identification and prioritization of business-related documents. The document list displays these values along with their respective corresponding documents, wherein documents with the same or similar BIVs may optionally be grouped together within the document list, and wherein different business indicator rows or columns may be presented so as to organize each type of business indicator value into a particular row or column. Finally, the user is then able to select a specific document from the document list based on one of the selected document's corresponding business indicator values.

In an embodiment, exemplary method of document error handling 900 includes processing the electronic document in response to a document processing input and based on the plurality of data fields. Exemplary method of document error handling 900 also includes reposting the electronic document in the document list in response to a document reposting input. For example, when an IDoc fails the initial IDoc processing process, such as when a number of data fields within the IDoc are found to include erroneous data when these data fields are compared to a data template for that particular IDoc, then a numerical fail status (e.g., a predefined numerical status of 51) is assigned to the IDoc. However, when a user changes one or more data fields within the IDoc, the status of this IDoc changes again to an edited status (e.g., a predefined numerical status of 69). Thus, the edited IDoc is reprocessed, wherein it is rechecked for compliance, and, consequently, this IDoc will either post within a list of compliant IDocs or else fail (in which case it is again assigned a fail status). It is noted that, in one embodiment, this processing occurs in the background of the document error handling process such that a user may continue working with another portion of the algorithm without interruption. Furthermore, when a document fails during this reprocessing, this document is reposted in the document list in response to reposting selection, which may be a default setting for the algorithm.

In one embodiment, exemplary method of document error handling 900 includes processing the electronic document in response to a document processing input and based on the plurality of data fields, removing the electronic document from the document list in response to a document archive input, and creating an archive copy of the electronic document in response to the document archive input. For example, when a number of different errors are identified with the IDoc such that the user does not consider the IDoc to be worth saving, the user may input the document archive input. Consequently, the electronic document will be removed from the document list, the status of the electronic document will be changed to an archived status, and an archive copy of the electronic document is created and stored. The user may then have the option of changing the status of this IDoc back to a failed status so that it may again be (1) listed in the document list, (2) edited and (3) reprocessed.

In an embodiment, exemplary method of document error handling 900 includes processing the electronic document in response to a document processing input and based on the plurality of data fields. Exemplary method of document error handling 900 also includes saving a change to the electronic document in a data storage unit in response to a document update command, wherein the change reflects the editing of the data field. To illustrate, consider the example where one or more changes to the electronic document are saved in a data storage unit 440 (such as, for example, in a central ERP database or in a local data storage unit) in response to the document update command 431, wherein these changes reflect how the aforementioned data field has been edited. This provides the user with the option of saving the IDoc and reprocessing it at a subsequent point in time.

In an embodiment, exemplary method of document error handling 900 includes generating an error list of the plurality of errors, accessing an error selection input associated with the error list, wherein the error selection input identifies the selected error, automatically identifying the data field from among the plurality of data fields in response to the error selection input and based on the data field corresponding to the selected error, and removing the selected error from the error list in response to the elimination of the selected error. For example, once a document is selected from the document list, a number of errors associated with the selected document are listed in the error list, and the user selects one of these errors by inputting an error selection input. Next, a data field that corresponds to the selected error is automatically identified as a result of an automated, error-driven field selection process (which is in contrast to a manual field selection process whereby the user manually selects the associated data field). Finally, the user edits this field to thereby correct the selected error, and this error is consequently removed from the error list.

Thus, it is noted that an automated process may be implemented so as to help drive the user toward the data fields of interest during the editing process. In one embodiment, exemplary method of document error handling 900 includes automatically identifying one or more other errors from among the plurality of errors that correspond to the selected error, automatically identifying one or more other data fields from among the plurality of data fields that correspond to the one or more other errors, respectively, automatically editing the one or more other data fields based on the editing of the data field to thereby enable an elimination of the one or more other errors, and automatically removing the one or more other errors from the error list in response to the elimination of the one or more other errors. In this manner, a number of corresponding data errors may be automatically corrected as a result of an automated error correction process based on the how the user edits the aforementioned selected data field.

The foregoing notwithstanding, it is noted that, in one embodiment, the document editing process is not error driven. To illustrate, an embodiment provides that exemplary method of document error handling 900 includes generating a data node list of a plurality of data nodes, accessing a data node selection associated with the data node list, wherein the data node selection identifies a selected data node from among the plurality of data nodes, and generating, in response to the data node selection and based on a view selection, a data field arrangement including a plurality of assigned data fields associated with the selected data node and a plurality of data field descriptions corresponding to the plurality of assigned data fields, respectively. Consider the example where the data node list is an IDoc navigation tree menu that sorts IDoc data (such as by business functionality) so as to enable relatively fast access to field information. Once a node in the data node list is selected, the screen on the right side of the graphical user interface will change to reflect the selection by displaying fields that are assigned to the selected node in one of a field editor and a list view editor. The user may then utilize the generated editor to correct errors within the current document.

In one embodiment, a backup copy of the electronic document is created based on an initial editing of the electronic document, wherein a reference is assigned to the backup copy, and wherein the reference links the backup copy to the edited electronic document. Additionally, exemplary method of document error handling 900 includes creating a new electronic document that corresponds to the edited electronic document, wherein the new electronic document includes the plurality of assigned data fields, and generating within the data field arrangement a first data segment including a first line of data from each data field from among the plurality of assigned data fields. Exemplary method of document error handling 900 also includes adding a second data segment within the data field arrangement in response to a data group addition selection, wherein the second data segment includes a second line of data from each data field from among the plurality of assigned data fields, removing one of the first and second data segments from the data field arrangement in response to a data group removal selection, and updating the reference such that the backup copy is linked to the new electronic document rather than to the edited electronic document.

To illustrate, consider the example where the electronic document is initially edited with a current ERP platform, and where a backup copy of the edited electronic document is created based on the initial editing of the edited electronic document, wherein a reference is assigned to the backup copy that links the backup copy to the edited electronic document. A new electronic document is created that corresponds to the edited electronic document, such as where the new electronic document is an exact copy of the edited electronic document, except that the new electronic document is not linked to the backup copy when it is created. Consequently, a number of data group additions and/or removals may be carried out within the new electronic document irrespective of the link between the edited electronic document and the backup copy. After such advanced editing has finished, the link between the edited electronic document and the backup copy is severed, and a new link between the new electronic document and the backup copy is established such that the new electronic document, along with the implemented data group additions and/or removals embodied therein, takes the place of the edited electronic document.

Exemplary Computer System Environment

It is noted that various components of the present technology may be hard-wired or configured to carry out various actions and operations discussed herein. Pursuant to one embodiment, however, a computer system may be implemented to carry out various operations. Indeed, one embodiment provides that a computer-readable medium may be implemented, wherein the computer-readable medium stores a set of instructions that when executed cause a computer system to perform a method or process of the present technology. As such, an exemplary computer system environment will now be explored. It is noted, however, that the present technology is not limited to either this exemplary computer system environment or any of the exemplary components or configurations associated therewith.

Figure 10:
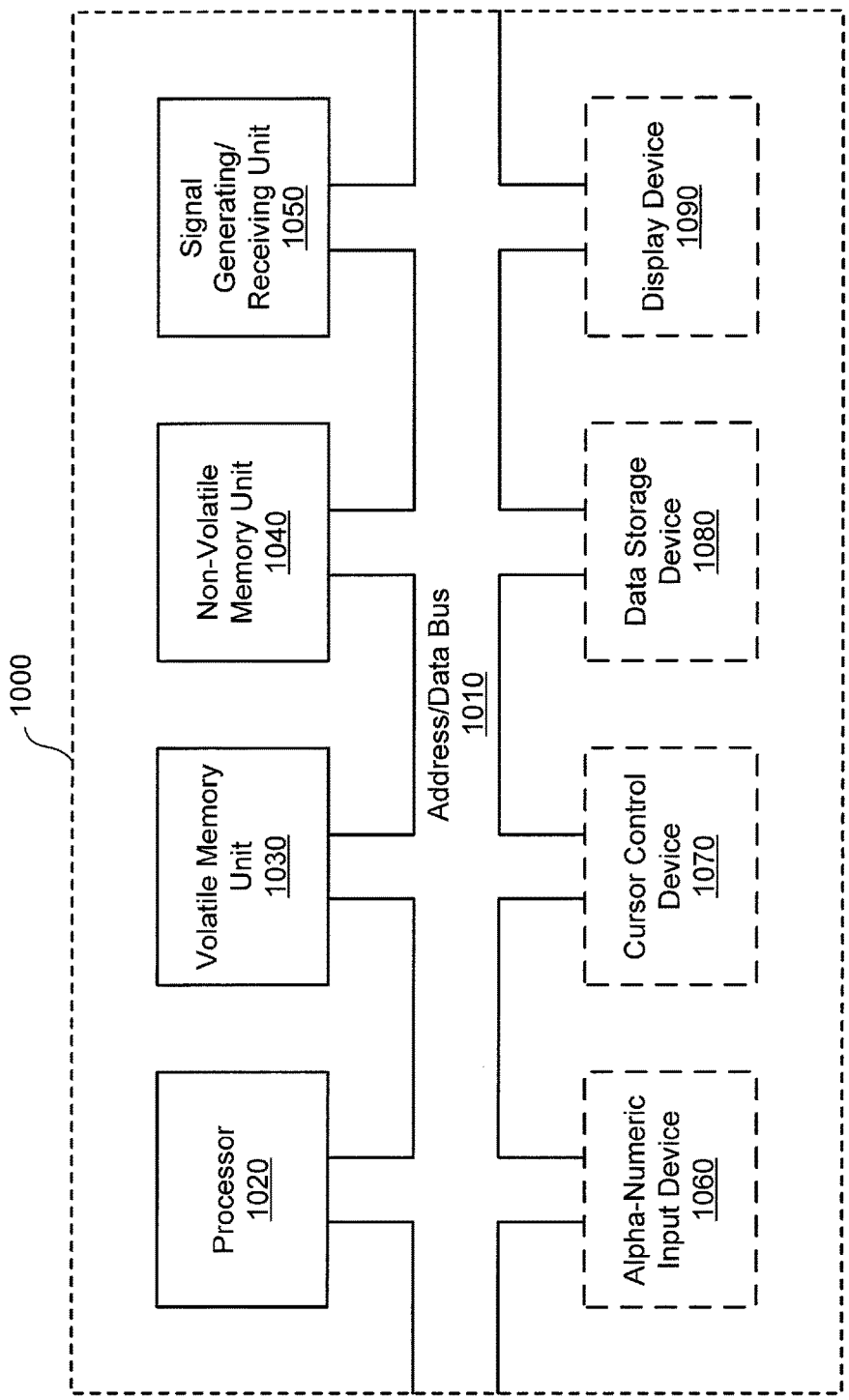
FIG. 10 is a diagram of an exemplary computer system in accordance with an embodiment.

With reference now to FIG. 10, an exemplary computer system 1000 in accordance with an embodiment is shown. Computer system 1000 may be any type of computing device (e.g., a computing device utilized to perform calculations, processes, operations, and functions associated with a program or algorithm). Within the discussions herein, certain processes and steps are discussed that are realized, pursuant to one embodiment, as a series of instructions, such as a software program, that reside within computer-readable memory units and are executed by one or more processors of computer system 1000. When executed, the instructions cause computer system 1000 to perform specific actions and exhibit specific behavior described in various embodiments herein.

With reference still to FIG. 10, computer system 1000 includes or comprises an address/data bus 1010 configured to communicate information between a source and a destination. In addition, one or more data processors, such as processor 1020, are coupled with address/data bus 1010, wherein processor 1020 is configured to process information and instructions. In an embodiment, processor 1020 is a microprocessor or microcontroller, although other types of data processors may be implemented.

Computer system 1000 also includes or comprises a number of data storage components, such as a volatile memory unit 1030 coupled with address/data bus 1010 and configured to store information and instructions for processor 1020, wherein volatile memory unit 1030 may include or comprise random access memory (RAM), such as static RAM and/or dynamic RAM. Moreover, computer system 1000 further includes or comprises a non-volatile memory unit 1040 coupled with address/data bus 1010 and configured to store static information and instructions for processor 1020. In an embodiment, non-volatile memory unit 1040 includes read-only memory (ROM), such as programmable ROM, flash memory, erasable programmable ROM (EPROM), and/or electrically erasable programmable ROM (EEPROM). The foregoing notwithstanding, it is noted that the present technology is not limited to the use of the exemplary storage units discussed herein, and that other types of memory may be implemented.

With reference still to FIG. 10, computer system 1000 also includes or comprises one or more signal generating and receiving devices, such as signal generating/receiving unit 1050, coupled with address/data bus 1010 and configured to enable computer system 1000 to interface with other electronic devices and computer systems. The communication interface(s) implemented by the one or more signal generating and receiving devices may utilize wired (e.g., serial cables, modems, and network adaptors) and/or wireless (e.g., wireless modems and wireless network adaptors) communication technologies.

In an embodiment, computer system 1000 optionally includes or comprises an alphanumeric input device 1060 coupled with address/data bus 1010, wherein alphanumeric input device 1060 includes or comprises alphanumeric and function keys for communicating information and command selections to processor 1020. Moreover, pursuant to one embodiment, a cursor control device 1070 is optionally coupled with address/data bus 1010, wherein optional cursor control device 1070 is configured to communicate user input information and command selections to processor 1020. For example, cursor control device 1070 may be implemented using a mouse, a track-ball, a track-pad, an optical tracking device, or a touch screen. In a second example, a cursor is directed and/or activated in response to input from alphanumeric input device 1060, such as when special keys or key sequence commands are executed. It is noted, however, that a cursor may be directed by other means, such as, for example, voice commands.

With reference still to FIG. 10, computer system 1000, pursuant to one embodiment, optionally includes or comprises a data storage device 1080 coupled with address/data bus 1010, wherein data storage device 1080 is configured to store information and/or computer-executable instructions. To illustrate, one example provides that data storage device 1080 is a magnetic or optical disk drive, such as a hard disk drive (HDD), a floppy disk drive, a compact disk ROM (CD-ROM) drive, or a digital versatile disk (DVD) drive.

Furthermore, in an embodiment, a display device 1090 is optionally coupled with address/data bus 1010 and configured to display video and/or graphics. Display device 1090 may be, for example, a cathode ray tube (CRT) display, a liquid crystal display (LCD), a field emission display (FED), a plasma display, or any other display device suitable for displaying video and/or graphic images and alphanumeric characters capable of being recognized by a user.

It is noted that computer system 1000 is presented as an exemplary computing environment in accordance with an embodiment. However, computer system 1000 is not strictly limited to being a computer system. For example, one embodiment provides that computer system 1000 represents a type of data processing analysis that may be used in accordance with various embodiments described herein. Moreover, other computing systems may also be implemented. Indeed, the present technology is not limited to any particular data processing environment.

Exemplary Concepts

It is noted that the foregoing discussion has presented at least the following exemplary concepts:

Concept 1. A computer-readable medium storing a set of instructions that when executed cause a computer system to perform a method of document error handling, the method comprising:
  accessing an electronic document comprising a plurality of data fields;
  identifying a plurality of errors associated with the electronic document;
  accessing a data field from among the plurality of data fields, the data field corresponding to a selected error from among the plurality of errors; and editing the data field in response to an error editing input to thereby enable an elimination of the selected error.

Concept 2. The computer-readable medium of Concept 1, wherein the method further comprises:
accessing a plurality of electronic documents and at least one data parameter;
conducting a comparison between the plurality of electronic documents and the at least one data parameter;
generating a document list of at least two electronic documents from among the plurality of electronic documents based on the comparison; and
selecting the electronic document from among the at least two electronic documents in response to a document selection input.

Concept 3. The computer-readable medium of Concept 2, wherein the method further comprises:
identifying a plurality of business indicator values associated with the at least two electronic documents, respectively; and
ordering the at least two electronic documents in the document list based on the plurality of business indicator values.

Concept 4. The computer-readable medium of Concept 2, wherein the method further comprises:
processing the electronic document in response to a document processing input and based on the plurality of data fields; and
reposting the electronic document in the document list in response to a document reposting input.

Concept 5. The computer-readable medium of Concept 2, wherein the method further comprises:
processing the electronic document in response to a document processing input and based on the plurality of data fields; and
removing the electronic document from the document list in response to a document archive input.

Concept 6. The computer-readable medium of Concept 1, wherein the method further comprises:
processing the electronic document in response to a document processing input and based on the plurality of data fields; and
saving a change to the electronic document in a data storage unit in response to a document update command, the change reflecting the editing of the data field.

Concept 7. The computer-readable medium of Concept 1, wherein the method further comprises:
generating an error list of the plurality of errors;
accessing an error selection input associated with the error list, the error selection input identifying the selected error;
automatically identifying the data field from among the plurality of data fields in response to the error selection input and based on the data field corresponding to the selected error; and
removing the selected error from the error list in response to the elimination of the selected error.

Concept 8. The computer-readable medium of Concept 1, wherein the method further comprises:
automatically identifying one or more other errors from among the plurality of errors that correspond to the selected error;
automatically identifying one or more other data fields from among the plurality of data fields that correspond to the one or more other errors, respectively;
automatically editing the one or more other data fields based on the editing of the data field to thereby enable an elimination of the one or more other errors; and
automatically removing the one or more other errors from the error list in response to the elimination of the one or more other errors.

Concept 9. The computer-readable medium of Concept 1, wherein the method further comprises:
generating a data node list of a plurality of data nodes;
accessing a data node selection associated with the data node list, the data node selection identifying a selected data node from among the plurality of data nodes; and
generating, in response to the data node selection and based on a view selection, a data field arrangement comprising a plurality of assigned data fields associated with the selected data node and a plurality of data field descriptions corresponding to the plurality of assigned data fields, respectively.

Concept 10. The computer-readable medium of Concept 9, wherein a backup copy of the electronic document is created based on an initial editing of the electronic document, and wherein a reference is assigned to the backup copy, the reference linking the backup copy to the edited electronic document, and the method further comprising:
creating a new electronic document that corresponds to the edited electronic document, the new electronic document comprising the plurality of assigned data fields;
generating within the data field arrangement a first data segment comprising a first line of data from each data field from among the plurality of assigned data fields;
adding a second data segment within the data field arrangement in response to a data group addition selection, the second data segment comprising a second line of data from each data field from among the plurality of assigned data fields;
removing one of the first and second data segments from the data field arrangement in response to a data group removal selection; and
updating the reference such that the backup copy is linked to the new electronic document rather than to the edited electronic document.

Concept 11. A computer-readable medium storing a set of instructions that when executed cause a computer system to perform a method of document error handling, the method comprising:
accessing an electronic document comprising a plurality of data fields;
identifying a plurality of errors associated with the electronic document;
accessing a data field from among the plurality of data fields, the data field corresponding to a selected error from among the plurality of errors;
identifying one or more other errors from among the plurality of errors that correspond to the selected error;
identifying one or more other data fields from among the plurality of data fields that correspond to the one or more other errors, respectively;
editing the data field in response to an error editing input to thereby enable an elimination of the selected error; and
editing the one or more other data fields based on the editing of the data field to thereby enable an elimination of the selected error and an elimination of the one or more other errors.

Concept 12. The computer-readable medium of Concept 11, wherein the method further comprises:
accessing a plurality of electronic documents and at least one data parameter;

conducting a comparison between the plurality of electronic documents and the at least one data parameter;
generating a document list of at least two electronic documents from among the plurality of electronic documents based on the comparison;
identifying a plurality of business indicator values associated with the at least two electronic documents, respectively;
ordering the at least two electronic documents in the document list based on the plurality of business indicator values; and
selecting the electronic document from among the at least two electronic documents in response to a document selection input.

Concept 13. The computer-readable medium of Concept 12, wherein the method further comprises:
processing the electronic document in response to a document processing input and based on the plurality of data fields; and
reposting the electronic document in the document list in response to a document reposting input.

Concept 14. The computer-readable medium of Concept 12, wherein the method further comprises:
processing the electronic document in response to a document processing input and based on the plurality of data fields; and
removing the electronic document from the document list in response to a document archive input.

Concept 15. The computer-readable medium of Concept 11, wherein the method further comprises:
processing the electronic document in response to a document processing input and based on the plurality of data fields; and
saving a change to the electronic document in a data storage unit in response to a document update command, the change reflecting the editing of the data field.

Concept 16. The computer-readable medium of Concept 11, wherein the method further comprises:
generating an error list of the plurality of errors;
accessing an error selection input associated with the error list, the error selection input identifying the selected error;
automatically identifying the data field from among the plurality of data fields in response to the error selection input and based on the data field corresponding to the selected error;
removing the selected error from the error list in response to the elimination of the selected error; and
removing the one or more other errors from the error list in response to the elimination of the one or more other errors.

Concept 17. The computer-readable medium of Concept 11, wherein the method further comprises:
generating a data node list of a plurality of data nodes;
accessing a data node selection associated with the data node list, the data node selection identifying a selected data node from among the plurality of data nodes; and
generating, in response to the data node selection and based on a view selection, a data field arrangement comprising a plurality of assigned data fields associated with the selected data node and a plurality of data field descriptions corresponding to the plurality of assigned data fields, respectively.

Concept 18. The computer-readable medium of Concept 17, wherein a backup copy of the electronic document is created based on an initial editing of the electronic document, and wherein a reference is assigned to the backup copy, the reference linking the backup copy to the edited electronic document, and the method further comprising:
creating a new electronic document that corresponds to the edited electronic document, the new electronic document comprising the plurality of assigned data fields;
generating within the data field arrangement a first data segment comprising a first line of data from each data field from among the plurality of assigned data fields;
adding a second data segment within the data field arrangement in response to a data group addition selection, the second data segment comprising a second line of data from each data field from among the plurality of assigned data fields;
removing one of the first and second data segments from the data field arrangement in response to a data group removal selection; and
updating the reference such that the backup copy is linked to the new electronic document rather than to the edited electronic document.

Concept 19. A computer-readable medium storing a set of instructions that when executed cause a computer system to perform a method of document error handling, the method comprising:
accessing an electronic document comprising a plurality of data fields;
identifying a plurality of errors associated with the electronic document;
generating an error list of the plurality of errors;
accessing an error selection input associated with the error list, the error selection input identifying a selected error from among the plurality of errors;
automatically identifying a data field from among the plurality of data fields in response to the error selection input and based on the data field corresponding to the selected error;
editing the data field in response to an error editing input to thereby enable an elimination of the selected error; and
removing the selected error from the error list in response to the elimination of the selected error.

Concept 20. The computer-readable medium of Concept 19, wherein the method further comprises:
automatically identifying one or more other errors from among the plurality of errors that correspond to the selected error;
automatically identifying one or more other data fields from among the plurality of data fields that correspond to the one or more other errors, respectively;
automatically editing the one or more other data fields based on the editing of the data field to thereby enable an elimination of the one or more other errors; and
automatically removing the one or more other errors from the error list in response to the elimination of the one or more other errors.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

Furthermore, although various embodiments discussed herein involve a series of specific steps, actions or operations for achieving a result, it is noted these steps, actions or operations are examples of various steps, actions or operations that may be performed in accordance with a number of exemplary implementations. Indeed, the embodiments disclosed herein may be configured such that various other steps, actions or operations are performed, such as variations of the steps, actions or operations recited. Moreover, the steps disclosed herein may be performed in an order different than presented, and not all of the steps are necessarily performed in a particular embodiment.

What is claimed is:

1. A non-transitory computer-readable medium storing a set of instructions that when executed cause a computer system to perform a method, the method comprising:
   generating intermediate electronic documents to interface between two enterprise resource planning systems or between an enterprise resource planning system and a translator module;
   detecting errors in the intermediate electronic documents, including:
      comparing data fields within the intermediate electronic documents with data templates for each of the intermediate electronic documents to detect erroneous data; and,
   handling detected document errors, including:
      accessing an intermediate electronic document by an editor;
      displaying a data node list that includes a plurality of data nodes;
      identifying a selected data node from among the plurality of data nodes;
      displaying a data field arrangement for the selected data node, wherein the data field arrangement includes a plurality of data fields associated with the selected data node from the intermediate electronic document, wherein selection of a different selected data node would result in displaying a different data field arrangement that includes a different plurality of data fields;
      allowing editing of a selected field so as to correct or eliminate one or more errors listed in an error list, where the one or more errors appear in the selected field;
      adding at least one data segment to the data field arrangement for the selected data node in response to a data group addition selection, so that henceforth the at least one data segment will now be displayed in the data field arrangement for the selected data node; and,
      removing at least one data segment from the data field arrangement for the selected data node in response to a data group removal selection, so that the at least one data segment will no longer be displayed in the data field arrangement for the selected data node.

2. A non-transitory computer-readable medium as in claim 1 wherein the method additionally comprises:
   switching to a summarized mode where an error list summarizes errors and allows a user to correct multiple errors in a single step.

3. A non-transitory computer-readable medium as in claim 1 wherein the method additionally comprises:
   presenting the data node list as a navigation tree menu that sorts data.

4. A non-transitory computer-readable medium as in claim 1 wherein the method additionally comprises:
   sorting intermediate electronic documents using custom search fields.

5. A non-transitory computer-readable medium as in claim 1 wherein the method additionally comprises:
   prioritizing intermediate electronic documents using custom business indicators.

6. A non-transitory computer-readable medium storing a set of instructions that when executed cause a computer system to perform a method, the method comprising:
   generating intermediate electronic documents to interface between two enterprise resource planning systems or between an enterprise resource planning system and a translator module;
   detecting errors in the intermediate electronic documents, including:
      comparing data fields within the intermediate electronic documents with data templates for each of the intermediate electronic documents to detect erroneous data; and,
   handling detected document errors, including:
      selecting a first editor in response to a first editor selection, including:
         displaying a first editor screen that includes an error list,
         allowing field edits using a field editor so as to correct or eliminate one or more errors listed in the error list, and
         configuring the first editor screen in response to user selections; and,
      selecting a second editor in response to a second editor selection, including:
         accessing intermediate electronic documents by the second editor,
         generating a data node list that includes a plurality of data nodes,
         identifying a selected data node from among the plurality of data nodes,
         generating a data field arrangement for the selected data node, wherein the data field arrangement includes a plurality of data fields associated with the selected data node, and
         allowing editing, using the second editor, of a selected field so as to correct or eliminate one or more errors that appear in the selected field, where the one or more errors are listed in the error list.

7. A non-transitory computer-readable medium as in claim 6 additionally comprising:
   adding at least one data segment to the data field arrangement in response to a data group addition selection; and,
   removing at least one data segment from the data field arrangement in response to a data group removal selection.

8. A non-transitory computer-readable medium as in claim 6 wherein selecting the second editor additionally includes:
   switching to a summarized mode where an error list summarizes errors and allows a user to correct multiple errors in a single step.

9. A non-transitory computer-readable medium as in claim 6 wherein selecting the second editor additionally includes:
   presenting the data node list as a navigation tree menu that sorts data.

10. A non-transitory computer-readable medium as in claim 6 wherein the method additionally comprises:
    sorting intermediate electronic documents using custom search fields.

11. A non-transitory computer-readable medium as in claim 6 wherein the method additionally comprises:
prioritizing intermediate electronic documents using custom business indicators.

12. A non-transitory computer-readable medium storing a set of instructions that when executed cause a computer system to perform a method, the method comprising:
generating intermediate electronic documents to interface between two enterprise resource planning systems or between an enterprise resource planning system and a translator module;
detecting errors in the intermediate electronic documents, including:
comparing data fields within the intermediate electronic documents with data templates for each of the intermediate electronic documents to detect erroneous data; and,
handling detected document errors, including:
selecting a first editor in response to a first editor selection, including:
displaying a first editor screen that includes an error list, and
allowing field edits using a field editor so as to correct or eliminate one or more errors listed in the error list; and
selecting a second editor in response to a second editor selection, including:
accessing intermediate electronic documents by the second editor,
generating a data node list that includes a plurality of data nodes, and
allowing manual editing of fields using a list view editor so as to correct or eliminate one or more errors listed in the error list.

13. A non-transitory computer-readable medium as in claim 12 wherein selecting the first editor additionally includes:
configuring the first editor screen in response to user selections.

14. A non-transitory computer-readable medium as in claim 12 wherein selecting the second editor additionally includes:
identifying a selected data node from among the plurality of data nodes.

15. A non-transitory computer-readable medium as in claim 14 additionally comprising:
generating a data field arrangement for the selected data node, wherein the data field arrangement includes a plurality of data fields associated with the selected data node;
adding at least one data segment to the data field arrangement in response to a data group addition selection; and,
removing at least one data segment from the data field arrangement in response to a data group removal selection.

16. A non-transitory computer-readable medium as in claim 12 wherein selecting the second editor additionally includes:
switching to a summarized mode where an error list summarizes errors and allows a user to correct multiple errors in a single step.

17. A non-transitory computer-readable medium as in claim 12 wherein selecting the second editor additionally includes:
presenting the data node list as a navigation tree menu that sorts data.

18. A non-transitory computer-readable medium as in claim 12 wherein the method additionally comprises:
sorting intermediate electronic documents using custom search fields.

19. A non-transitory computer-readable medium as in claim 12 wherein the method additionally comprises:
prioritizing intermediate electronic documents using custom business indicators.

* * * * *